(12) United States Patent
Gould et al.

(10) Patent No.: US 8,069,129 B2
(45) Date of Patent: Nov. 29, 2011

(54) EDITING AND COMPILING BUSINESS RULES

(75) Inventors: Joel Gould, Winchester, MA (US);
Joseph Skeffington Wholey, III, Belmont, MA (US); Timothy Perkins, Somerville, MA (US)

(73) Assignee: Ab Initio Technology LLC, Lexington, MA (US)

( * ) Notice: Subject to any disclaimer, the term of this patent is extended or adjusted under 35 U.S.C. 154(b) by 1203 days.

(21) Appl. No.: 11/733,434

(22) Filed: Apr. 10, 2007

(65) Prior Publication Data

US 2008/0256014 A1  Oct. 16, 2008

(51) Int. Cl.
*G06F 17/00* (2006.01)
(52) U.S. Cl. ........................................... 706/47
(58) Field of Classification Search .................... 706/47, 706/48; 717/117
See application file for complete search history.

(56) References Cited

U.S. PATENT DOCUMENTS

| | | | |
|---|---|---|---|
| 5,734,886 A | | 3/1998 | Grosse et al. |
| 5,832,497 A | * | 11/1998 | Taylor ................................. 1/1 |
| 5,966,072 A | | 10/1999 | Stanfill et al. |
| 6,477,520 B1 | * | 11/2002 | Malaviya et al. ............... 706/47 |
| 6,728,879 B1 | | 4/2004 | Atkinson |
| 7,020,869 B2 | * | 3/2006 | Abrari et al. .................. 717/108 |
| 7,164,422 B1 | | 1/2007 | Wholey, III et al. |
| 7,565,642 B2 | * | 7/2009 | Moore et al. .................. 717/117 |
| 2003/0120593 A1 | | 6/2003 | Bansal et al. |
| 2004/0034848 A1 | * | 2/2004 | Moore et al. .................. 717/117 |
| 2004/0210661 A1 | * | 10/2004 | Thompson ..................... 709/228 |
| 2005/0038764 A1 | * | 2/2005 | Minsky et al. .................. 706/47 |
| 2005/0246686 A1 | | 11/2005 | Seshadri et al. |
| 2006/0095466 A1 | | 5/2006 | Stevens et al. |
| 2006/0294150 A1 | | 12/2006 | Stanfill et al. |
| 2007/0021995 A1 | | 1/2007 | Toklu et al. |
| 2007/0050340 A1 | | 3/2007 | von Kaenel et al. |
| 2008/0059436 A1 | | 3/2008 | Crocker |

FOREIGN PATENT DOCUMENTS

WO  WO 01/86592  11/2001

OTHER PUBLICATIONS

"ILog JRules: Leading the Way in Business Rule Management Systems," White Paper. *ILog Business Rules*, Mar. 2005, 15 pages.
International Search Report & Written Opinion in PCT application No. PCT/US09/49299 mailed Aug. 12, 2009, 7 pages.

(Continued)

*Primary Examiner* — Jeffrey A Gaffin
*Assistant Examiner* — David H Kim
(74) *Attorney, Agent, or Firm* — Fish & Richardson, P.C.

(57) ABSTRACT

A component in a graph-based computation having data processing components connected by linking elements representing data flows is updated by receiving a rule specification, generating a transform for transforming data based on the rule specification, associating the transform with a component in the graph-based computation, and in response to determining that a new rule specification has been received or an existing rule specification has been edited, updating the transform associated with the component in the graph-based computation according to the new or edited rule specification. A computation is tested by receiving a rule specification including a set of rule cases, receiving a set of test cases, each test case containing a value for one or more of the potential inputs, and for each test case, identifying one of the rule cases that will generate an output given the input values of the test case.

43 Claims, 10 Drawing Sheets

OTHER PUBLICATIONS

International Search Report & Written Opinion issued in PCT Application No. PCT/US10/22593, mailed Mar. 12, 2010, 8 pages.
PCT International Search Report and Written Opinion dated Jul. 9, 2008. International Application No. PCT/US2008/058360, 14 pages.
Affidavit Pursuant to 37 CFR 1.56 signed by Craig W. Stanfill on Sep. 23, 2009, 2 pages.
ILOG JRules Performance Analysis and Capacity Planning, ILOG Business Rules Product Management, Version 1.0, Sep. 2005, 16 pages.
Owen, James. "Clash of the Java rule Titans," InfoWorld <http://www.infoworld.com>, Jul. 17, 2006, 4 pages.

* cited by examiner

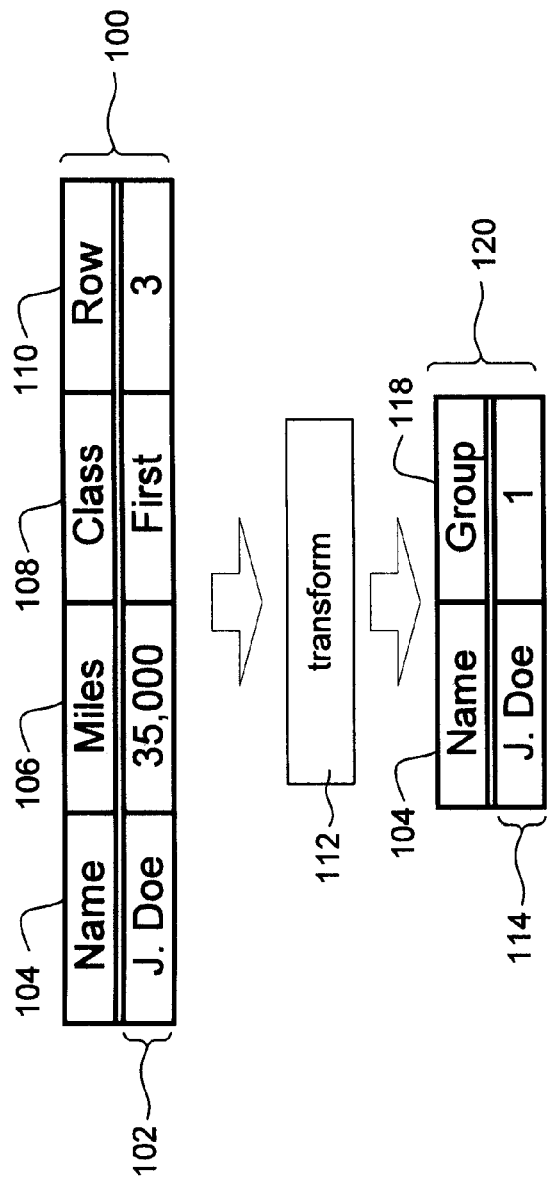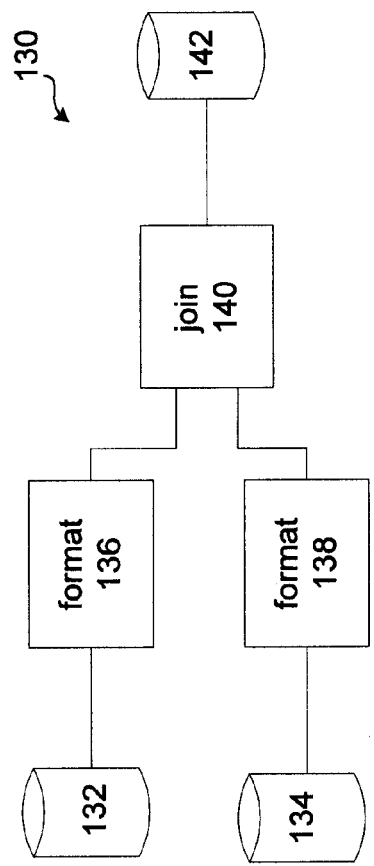
Figure 1A
Figure 1B

| | Total frequent flyer miles (202) | Current year frequent flyer miles (204) | Class of seat (206) | Row of seat (208) | Boarding Group (212) |
|---|---|---|---|---|---|
| 210a | >= 1,000,000 | | | | 1 |
| 210b | | | first | | 1 |
| 210c | >= 100,000 | >= lat year frequent flyer miles | | | 2 |
| 210d | | | business | | 2 |
| 210e | | | else | <= 10 | 2 |
| 210f | | | same | <= 40 | 3 |
| 210g | | | same | <= 50 | 4 |
| 210h | | | same | else | 5 |

| Expression | Boarding Group |
|---|---|
| Total frequent flyer miles >= 1,000,000 | 1 |

220b

| Expression | Boarding Group |
|---|---|
| Class of seat == first | 1 |

220c

| Expression | Boarding Group |
|---|---|
| Total frequent flyer miles >= 100,000 and Current year frequent flyer miles >= Last year frequent flyer miles | 2 |

220d

| Expression | Boarding Group |
|---|---|
| Class of seat == business | 2 |

220e

| Row of Seat | Boarding Group |
|---|---|
| <= 10 | 2 |
| <= 40 | 3 |
| <= 50 | 4 |
| else | 5 |

| | Test Case | | | | | | | | | |
|---|---|---|---|---|---|---|---|---|---|---|
| | a | b | ... | m | n | o | p | q | r | ... |
| Input Total frequent flyer miles | 2,000,000 | 2,000,000 | ... | 500,000 | 500,000 | 500,000 | 500,000 | 500,000 | 500,000 | ... |
| Current year frequent flyer miles | 200,000 | 200,000 | ... | 200,000 | 200,000 | 200,000 | 100,000 | 100,000 | 100,000 | ... |
| Last year frequent flyer miles | 150,000 | 150,000 | ... | 150,000 | 150,000 | 150,000 | 150,000 | 150,000 | 150,000 | ... |
| Class of seat | first | coach | ... | coach | coach | coach | coach | coach | coach | ... |
| Row of seat | 5 | 15 | ... | 5 | 15 | 45 | 5 | 15 | 45 | ... |
| Output Boarding Group | 1 | 1 | ... | 2 | 2 | 2 | 2 | 3 | 4 | ... |

Fig. 3

EDITING AND COMPILING BUSINESS RULES

TECHNICAL FIELD

This invention relates to editing and compiling business rules.

BACKGROUND

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. In some cases, the computations associated with a vertex is described in human-readable form referred to as "business rules."

SUMMARY

In general, in one aspect, a component in a graph-based computation having data processing components connected by linking elements representing data flows is updated by receiving a rule specification, generating a transform for transforming data based on the rule specification, associating the transform with a component in the graph-based computation, and in response to determining that a new rule specification has been received or an existing rule specification has been edited, updating the transform associated with the component in the graph-based computation according to the new or edited rule specification.

Implementations may include one or more of the following features.

Receiving the rule specification includes receiving from a user a row of a rule specification table, the row defining a rule case and containing a relationship for each of a set of one or more potential inputs. Receiving the rule specification also includes receiving from the user a second row of the table, the second row defining a second rule case and containing a second relationship for each of a second set of one or more of the potential inputs. The relationship includes one or more of having a value equal to a threshold, having a value above a threshold, having a value below a threshold, having a value belonging to a set of values, having a value matching a pattern, having a relationship to a value of another input, having a relationship to a value of an output of another rule specification, or having a relationship to a value in a memory. The row also contains an output including one or more or a combination of values of the inputs, a pre-determined value, or a value computed from one or more of the values of the inputs. Receiving a table including a set of test columns, each test column containing a value for one or more of the potential inputs, and for each test column, identifying a row of the rule specification that will generate an output given the input values of the test column, and outputting to a user the identification of the identified row for each test column. Generating a table including a results row for each test column, each results row indicating an output that will be generated given the input values of the test column. Generating the table includes, in each results row, indicating whether the output that will be generated is changed from an output that was indicated for a previous version of the rule specification. In response to a user interaction with a results row, indicating which rule case of the rule specification will generate the output in that results row.

Generating a table including an evaluation row corresponding to each row of the rule specification, in each evaluation row of the table, for each potential input, indicating whether the value in a first test column for that potential input satisfied the relationship for that potential input, and in an evaluation row corresponding to the row of the rule specification that will generate an output given the input values of the first test column, indicating the output that will be generated. The evaluation rows have an order corresponding to an order of the rows of the rule specification, and the evaluation row in which the output is indicated corresponds to the first row of the rule specification for which each of the relationships for the potential inputs is satisfied. Indicating an output that will be generated in each evaluation row corresponding to a row of the rule specification for which each of the relationships for the potential inputs is satisfied. Generating a table including an evaluation row corresponding to each row of the rule specification, in each evaluation row, indicating how many test columns have inputs that satisfy the relationships in the corresponding row of the rule specification. Each test column also contains an expected output value, each results row indicating whether the output that will be generated given the input values of the corresponding test column match the expected output in that test column. In response to determining that, for each test column, at least one row of a second rule specification will generate an output given the input values of the test column, determining that a rule set including the first rule specification and the second rule specification is valid.

Generating a table including a results row for each test column, each results row indicating each output generated by a row in one of the rule specifications given the input values of the test column. For an output that will be generated given the input values of a first test column, generating a graphical display of interrelationships between inputs and outputs of rule specifications that will result in the generation of that output. Receiving the table of test column includes receiving from a user a set of input values, matching the set of input values to the potential input values of the rule specification, and storing the set of input values to a column of the table. The receiving of a set of input values is in response to displaying identifications of the potential input values. In response to determining that each rule specification in a set of rule specifications will generate at least one output, determining that the set of rule specifications is valid. In response to determining that the rule specification is not valid, communicating to a source of the rule specification that the rule specification is not valid.

Updating the transform includes confirming that the rule specification is valid, generating a new transform based on the new or edited rule specification, disassociating the first transform from the component, and associating the new transform with the component. Updating the transform includes confirming that the rule specification is valid, waiting for the graph-based computation to be executed, when the component is activated, generating a new transform based on the new or edited rule specification, and associating the new transform with the component. Generating the transform includes converting each of a plurality of rule cases in the rule specification to a logical expression to form a plurality of logical expressions, and compiling the plurality of logical expressions into computer-executable code. Compiling the plurality of logical expressions includes one or more of combining expressions, optimizing individual expressions, and optimizing groups of expressions. Compiling the plurality of logical expressions includes associating the expressions with components suitable for use in the graph-based computation.

In general, in one aspect, a computation is tested by receiving a rule specification including a set of rule cases, each rule case including a relationship for potential inputs and a corresponding output, receiving a set of test cases, each test case containing a value for one or more of the potential inputs, and for each test case, identifying one of the rule cases that will generate an output given the input values of the test case.

Implementations may include one or more of the following features.

In response to identifying a rule case that will generate an output for each test case, storing or outputting an indication that the rule specification is valid. In response to identifying a rule case that will generate an output for each test case, storing or outputting an indication of the output that will be generated. Receiving the set of test cases includes receiving a table including a set of test columns, each test column containing the value for the one or more of the potential inputs for a corresponding one of the test cases. For each test case and the identified rule case for that test case, indicating what output will be generated by the identified rule case. For each test case and the identified rule case for that test data set, identifying one or more of the input values in the test case as having caused the identified rule case to generate an output. also including for each test case, indicating for each rule case which relationships of that rule case were satisfied by the values in the test case and which were not.

The rule cases have an order, and the identified rule case for each test case corresponds to the first rule case in the order for which each of the relationships for the potential inputs is satisfied. Receiving a second rule specification including a second set of rule cases, one or more of the rule cases including a relationship for one or more outputs of the first rule specification and a corresponding output of the second rule specification. For each test case, identifying one of the rule cases of the second rule specification that will generate an output given the input values of the test case and the output of the identified rule case of the first rule specification. For each test case, generating a graphical display of interrelationships between inputs and outputs of the first and second rule specifications that will result in the generation of the second rule specification's output. Indicating, for each test case, each rule case that will generate an output given the input values of the test case. Indicating, for each rule case, how many of the test cases have values for the potential inputs that will cause that rule case to generate an output.

Each of the test cases includes an output. Determining whether the output generated by the identified rule case will match the output included in the test case, and storing or communicating the results of the determination. Generating a table including a results row for each test case, each results row indicating the output that will be generated by the rule specification given the input values of the test case. In each results row, indicating whether the output that will be generated is changed from an output that was indicated for a previous version of the rule specification. In response to a user interaction with a results row, indicating the identified rule case that will generate the output in that results row. For one of the test cases, generating a table including an evaluation row corresponding to each rule case of the rule specification, in each evaluation row of the table, for each potential input, indicating whether the value for that potential input in the test case satisfied the relationship for that potential input in the rule case corresponding to that evaluation row. In an evaluation row of the table corresponding to the identified rule case for the test case, indicating the output that will be generated by that rule case.

The evaluation rows have an order corresponding to an order of the rule cases within the rule specification, and the evaluation row in which the output is indicated corresponds to the first rule case for which each of the relationships for the potential inputs is satisfied. Indicating an output that will be generated in each evaluation row that corresponds to a rule case for which each of the relationships for the potential inputs is satisfied by the test case. Receiving a second rule specification including a second set of rule cases, and for each test case, indicating an output that will be generated by each rule specification. Generating a table including a results row for each test case, each results row indicating each output generated by a rule specification given the input values of the test case. In response to user interaction with an indicated output in a results row, indicating which rule case will generate the indicated output. The indicated rule case is from the second rule specification, and indicating the indicated rule case includes indicating a rule case from the first rule specification and an output of that rule case that satisfies an input relationship of the indicated rule case. Receiving the set of test cases includes receiving from a user a set of input values, matching the set of input values to the potential input values of the rule specification, and storing the set of input values to a column of a table. The receiving of a set of input values is in response to displaying identifications of the potential input values.

In general, in one aspect, a component in a graph-based computation having data processing components connected by linking elements representing data flows, the component including a transform for transforming data based on a rule specification including a set of rule cases, each rule case including a relationship for potential inputs and a corresponding output, is tested by executing the graph-based computation on a set of input data in an execution environment, logging the input data and the output produced by the computation for each item of data in the set of input data, and in a testing environment separate from the execution environment, for each item of data in the logged set of input data, identifying one of the rule cases that would generate the logged output given the input values in the item.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A is an example of a transform.
FIG. 1B is an example of a graph.
FIG. 2A is an example of spreadsheet-based rule entry.
FIG. 2B is an example of a individual rules.
FIG. 3 is a test dataset.

DETAILED DESCRIPTION

Figure 1C:
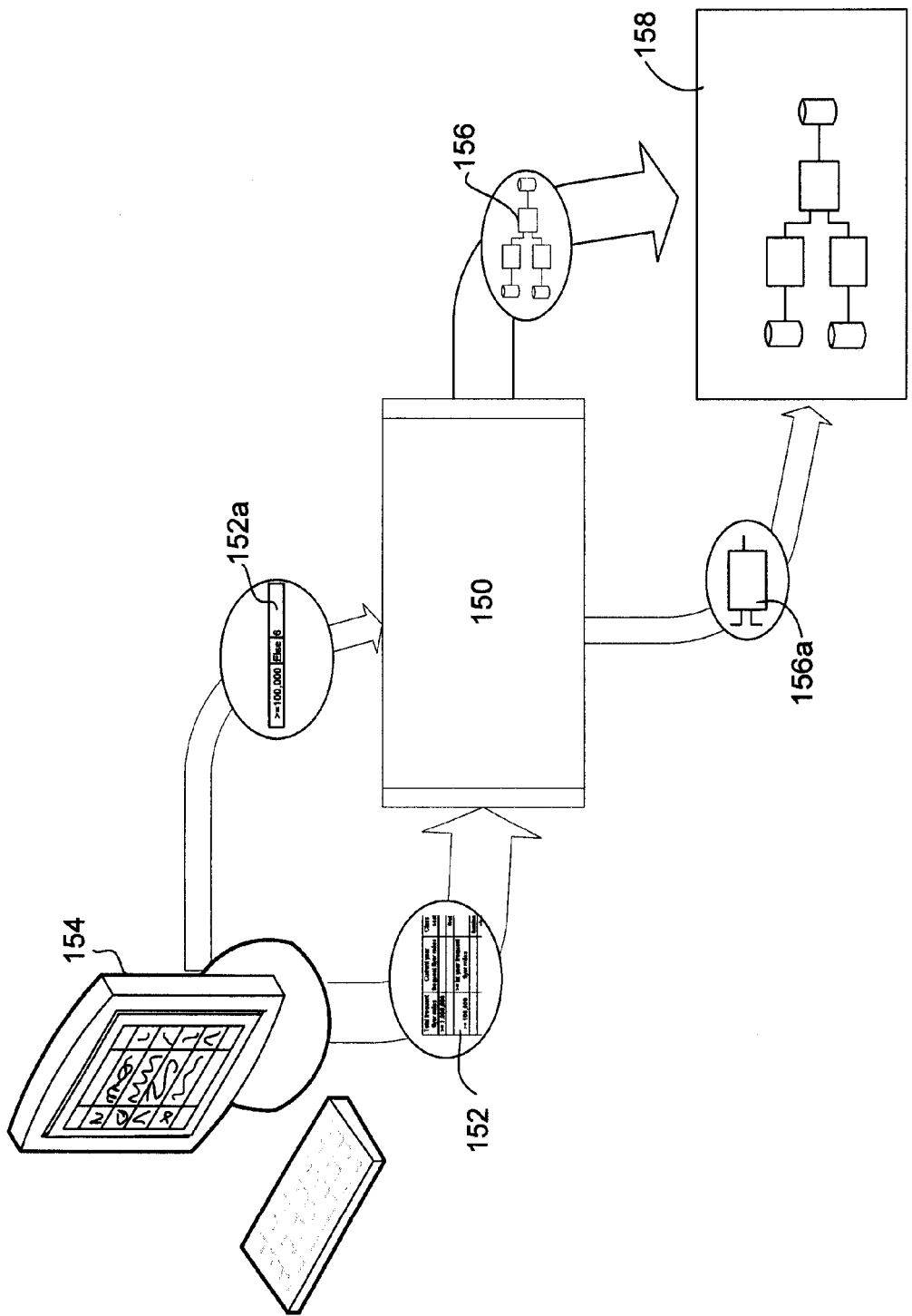
FIG. 1C is a block diagram of transform generation and updating.

A business rule can be expressed as a set of criteria that can be used, for example, for converting data from one format to another, making determinations about data, or generating new data based on a set of input data. For example, in FIG. 1A, a record 102 in a flight reservation system indicates the name 104 of a passenger, how many miles 106 he has flown this year, the class 108 of his ticket, and the row 110 he is seated in. A business rule indicates that such a passenger should be put in boarding group 1. A business rule is generally easy for a human to understand, i.e., "first class passengers are in group 1," but may need to be translated into something a computer can understand before it can be used to manipulate data. To implement business rules in a graph-based computation environment, a transform 112 is generated which receives input records, such as record 102, from one or more data sources, e.g., input dataset 100, and inserts an output record, e.g., record 114, indicating the passenger's name 104 and which group he is in 118 into an output dataset 120. Input and output datasets may also be referred to as data streams. The transforms may then be implemented in graph-based computations having data processing components connected by linking elements representing data flows. For example, the simple computation graph 130 of FIG. 1B takes as input two data sets 132, 134 (for example, frequent flier data and flight reservation data), formats the data in each set in separate format components 136, 138 so they can be used together, and joins them in join component 140 to produce an output data set 142. A transform may itself be a graph-based computation, such as that in the graph 130, or may be implemented within a component of a graph, such as the individual components 136, 138, and 140 of which the graph 130 is composed.

To simplify creation of transforms for non-technical users, a tool is provided for such users to input a set of business rules, referred to as a rule set, in a format with which they are familiar, that tells the computer system what they want the transform to do. A rule set is the set of rules that produce a single transform. A rule may be composed of one or more rule cases that compute different values for the rule's output depending on the input. A rule may also include other rules. Other rules in a rule set may produce values for additional or alternative outputs. A rule set may contain other rule sets, which we refer to as "included" rule sets.

A general model of the transform generation system is shown in FIG. 1C. A generator 150 receives as input a rule set 152 from an editor 154 and generates a transform 156. The generated transform 156 may be provided to a graph-based computation system 158 as a component to be used in a graph or as an entire graph itself, depending on the system's architecture and the purpose of the transform and the business rules. The generator 150 may be, for example, a compiler, a custom-built program, or another graph-based computation configured using standard tools to receive the rule set 152 and output the transform 156.

The generator 150 may also update the transform 156 when the rule set 152 is edited. When the rule set 152 is edited, the editor 154 may provide the entire rule set to the editor or it may provide only the new or modified rules or rule cases 152a. The generator 150 may generate an entirely new transform to replace the original transform 156, or it may provide a component 156a containing the transform, depending on the capability and needs of the system using the transform.

In some examples, a rule can be entered in a spreadsheet format, as shown in FIG. 2A. Trigger columns 202, 204, 206, 208 in spreadsheet 200 correspond to available data values, and rows 210a-h correspond to rule cases, i.e., sets of criteria that relate the available data values. A rule case 210n applies to a given record (e.g., 102 in FIG. 1A) if the data values of that record, for each trigger column in which the rule case has criteria, meets the triggering criteria. If a rule case 210n applies, output is generated based on one or more output columns 212. A rule case that has all of its input relationships satisfied may be referred to as "triggered." Each output column 212 corresponds to a potential output variable, and the value in the corresponding cell of the applicable row 210n determines the output, if any, for that variable. The cell could contain a value that is assigned to the variable or it could contain an expression that must be evaluated to generate the output value, as discussed below. There may be more than one output column, though only one is shown in FIG. 2A.

There may be several different types of trigger columns, including columns that correspond to a variable, columns that contain expressions but are calculated once and then treated like variables, and columns that only contain expressions. Other column types include columns that only contain data and columns that specify an expression to evaluate for every row, based on the columns that only contain data. Columns that only contain expressions are simpler than those corresponding to or treated as variables. Such columns can contain one of the following:

- An expression. The condition will be considered to be true if the evaluation of the expression evaluates to a non-zero, non-NULL value.
- The keyword "any," or an empty string. The condition is always true. Each empty cell in a trigger column is equivalent to one explicitly containing the keyword "any."
- The keyword "else." The condition is true if none of the cells above the cell containing "else" is true, in rows where all cells to the left are identical.
- The keyword "same". The condition is true if the cell above is true.

Columns that correspond to a variable can have two types of cells. One type of cell is an expression cell. Those cells behave exactly like cells in a column that contains only expressions, described above. However, the keyword "this" can be used in the expression to refer to the column variable. The other type of cell is a comparison value. An exemplary grammar for comparison values is as follows:

```
comparison_value ::= compound_value ( "or" compound_value )*
compound_value ::= simple_value ( "and" simple_value )*
simple_value ::= [ "not" ] ( value_expression | simple_function |
    membership_expr )
value_expression ::= [ operator ] value_element
operator ::= ">" | "<" | ">=" | "<=" | "!=" | "=" | "equals"
value_element ::= constant | constant | variable | "("expression ")"
simple_function ::= "is_null" | "is_blank" | "is_valid" | "is_defined" |
    "is_bzero"
membership_expr ::= "in" "[" value_element ( ( "," | "to" | "or" )
    value_element )* "]"
where a "*" means a term is repeated zero or more times.
```

Any suitable programming language or syntax may be used. Examples may include C, Java, DML, or Prolog. The column variable is compared against the comparison value according to the operator, function, or membership expression. In the example of FIG. 2A, the first two columns 202 and 204 contain comparison values with the ">=" operator, thus the criteria is met if the value for that column is greater than or equal to the corresponding number. If there is no operator, as in the "Class of Seat" column, then "equals" is assumed. A constant can be any legal constant in whatever programming language or syntax is used in the underlying system. The other constants and variable are business terms as defined within the rule set, as described below. A expression is any legal expression in the language being used that returns a compatible datatype that will be compared against the column variable. In some examples, expressions inside comparison values are enclosed in parenthesis to avoid ambiguity. For the simple_function, the function is applied to the column variable, so the "is_null" keyword is the same as the expression "is_null(this)".

In the example of FIG. 2A, the first row 210a has criteria in only one column, 202, which indicates that if the total number of frequent flier miles for a traveler is greater than 1,000,000, then that rule case applies regardless of what value any other columns may have. In that case, the "Boarding Group" output variable for that user is set to group 1. Likewise, the second rule case 210b indicates that any flier in first class is in group 1. In some examples, the rules are evaluated in order, so a traveler having over 1,000,000 miles and a first class ticket will be in group 1, but only the first rule case 210a will be triggered. Once a rule case is triggered, the other rule cases in that rule do not need to be evaluated.

The next rule case 210c is based on two input values 202 and 204—if the criteria defined for both total frequent flier miles and current-year miles are met, then the flier is in group 2. In a fourth rule case 210d, any business class customers are also in group 2. The remaining rule cases 210e-h contain criteria that relate to the other rule cases, i.e., "else" and "same." As discussed above, "else" indicates that none of the criteria in that column were met in rows that were above that one and which had the same criteria to the left (i.e., rules 210b and 210d), while "same" indicates that the rule case applies if the rule case above it applied with respect to that column. Thus, the fifth rule case 210e applies to any record that didn't match any criteria in the first two columns 202 or 204 (because it would have been handled by rule cases 210a or 210c), didn't have "first" or "business" in the "class of seat" column (the "else" keyword in column 206), and which has a "row of seat" value 208 less than or equal to 10. Each of the remaining rule cases 210f-h applies to records that also didn't match any higher rule case with values in columns 202 or 204, didn't have "first" or "business" in the "class of seat" column, and which have the appropriate "row of seat" value.

The rule cases 210a-h in the example of FIG. 2A can also be represented as individual simple rules, each in their own spreadsheet, as shown in FIG. 2B. Rules 220a-d corresponds to rows 210a-d of FIG. 2A, respectively, while rule 220e has four rule cases corresponding to rows 210e-h together. A user could create these individual rules separately, rather than generating the entire table shown in FIG. 2A. Each rule case contains a value for every trigger column and a value for every output column (the value can be blank, i.e., effectively set to "any"). When multiple rules generate the same output, the rules are ordered and they are considered in order until a rule case in one rule triggers on the inputs and generates an output. If no rule case in a rule triggers, the next rule that produces the same output is processed. If no cases in any rule trigger for an output, a default value is used.

In some examples, the editor interface may graphically identify cells that contain expressions. This will help the user understand the difference between an expression that will be evaluated to true or false on its own and an expression that returns a value that is compared against the column variable. When the user is typing, he can indicate that a particular cell is to be an expression cell by, for example, typing an asterisk at the beginning.

In some examples, values and expressions are DML expressions. The full DML language can be supported. The special keywords and the business names for fields and values are encoded as strings that are pre-processed out of the DML expressions. Note that the expressions can use the logical (business) names for variables, but can also refer to the actual physical names, though this may interfere with testing.

For columns that correspond to output variables, the cells can contain one of the following:

A value. The value that will be assigned to the output variable

An expression. The value of the expression is assigned to the output variable. If the expression evaluates to NULL then the field gets the NULL value, unless the output field is not-nullable. In which case, an error is generated.

The keyword "null". If the output field is nullable, then the field will be assigned NULL. Otherwise, an error is generated.

An empty string. If the output field has a default value, then the default value is assigned. Otherwise, the cell is treated as if it contains the keyword "null".

The keyword "same". The output field is assigned the same value computed in the cell above.

If possible, errors are reported as soon as possible (i.e. putting "null" in an output column for a non-nullable field). However, some errors cannot be reported until either test-time or run-time.

In addition to expressions, users may be allowed to attach comments to any cell in the rule. The comments can be displayed just like comments attached to cells in common spreadsheet programs such as Microsoft Excel.

In some examples, the rules editor interface may be configured to restrict what a user may enter more tightly than the technical requirements of the interface would require. For example, the interface may be configured to only allow certain types of variables or certain types of expressions in order to provide a simpler, more constrained user interface. The interface may also be configured to restrict which cells in a rule can be changed, based on a user's role or user ID. Such restrictions may be applied to a Rule set by an administrator.

Whether created as rows of a table or as individual rules, each rule has a certain set of attributes. Rule sets may determine these attributes for the rules they include. These attributes may include a name, a rule type, a description and comment field, a list of output variables, a list of input variables, a list of arguments, a list of trigger columns, a modification history, a test dataset, and an error handling behavior. A name is self-explanatory, and is used for listing the rule in a rule set. A rule type may be, for example, "normal" or "function." In some examples, the rule type is a property of the rule set. The list of output variables is the set of variables produced or assigned values by the rule. This may be inherited from the rule set, and there can be one or more outputs. The list of input variables identifies all the variables that the rule needs to evaluate a record, including those at the top of the columns and those used inside expressions (for example, the "last year frequent flyer miles" value used in rule 210c in FIG. 2A is used in an expression but does not have its own column).

In some examples, multiple rule cases may be used to generate multiple output records for a single input record. Such a rule set is referred to as a normalize rule set. In a normalize rule set, one of the outputs is identified as a key output. When the rules that compute the key output are evaluated, the rule case that triggered on the input and generated output is noted. The rules are then evaluated again, with the previously-triggered rule case disabled, to see if any other rule cases trigger and produce an output. This is repeated until no rule cases trigger. Each output may be stored as a separate output record. In some examples, rule cases are grouped, such that if one triggers, others in its group are also disabled on the next iteration for the same input.

In some examples, rules may be evaluated in a manner converse to that described above, with rule cases in rows being ANDed and columns being ORed. That is, a rule produces an output only if every row triggers (ANDing the rows) but only a single cell needs to be true for each row to trigger (ORing the columns).

The list of arguments is only present for function rules. It identifies the names and types of parameters that are inputs to the rule, and may be a property of the rule set. The list of trigger columns identifies which columns may trigger application of the rule. Beyond just the input variables shown in the example of FIGS. 2A and 2B, trigger columns could correspond to parameters, lookup variables, output variables from an earlier rule, output variables of included rule sets, parameters to the rule set, or expressions. They may also include input variables from function rules, i.e., arguments.

The modification history includes modification names, dates, and comments. In some examples, there is one modification history for each rule, and one for each test set (discussed below).

Error handling determines how the transform created from the rule set handles errors that occur when evaluating a rule. For handling errors in a trigger expression, the options are to allow the error, in which case the transform rejects the record that caused the error, or to ignore an error, which is equivalent to assuming the trigger expression to be false and moving on to the next rule. For output expressions, errors can be handled by to allowing the error and rejecting the record, ignoring the error and setting the output to NULL, or ignoring the row in the rule and moving on to the next row.

Test Data

To assist in evaluating whether a rule set will work as intended, it may include a test dataset. The test dataset for a rule set is a set of prototypical inputs and expected outputs, for example, as shown in FIG. 3. The test dataset consists of a spreadsheet-like table 400 with one row 402a-e for each field being referenced by the rules and one row 404 for each output (in this example, there is only one). The user then creates test cases represented in columns 406a-r of test data 405 and expected results 407. This test data 405 may be saved with the rule. The example of FIG. 3 contains possible inputs 402a-e and intended outputs 404 for the rules of FIGS. 2A-B. For various combinations 406 of frequent flyer miles and seating assignments, it shows what boarding group 404 should be calculated (there are many more combinations of possible inputs than are shown). In some examples, the test input includes a value for every variable in every lookup. Test input may also include a value for every parameter and a value to use as "now" for any rules that reference the current date or time. For testing individual units, the test input may include a value for any included rule set, so that included rule sets do not have to be evaluated when the including rule set is tested.

In some examples, the columns 402, 404 in the unit test table are determined by the software based on user action. When the user edits a rule, the rule's details are parsed and a definitive list of referenced input variables is generated. This list includes variables used in column headings and variables embedded in expressions. One column is generated for each variable, each technical variable embedded in an expression, and each lookup expression. In some examples, a user creates a test table 400 by providing test cases one at a time. For example, the user may specify that a customer with 2,000,000 total frequent flyer miles, 200,000 miles this year, 150,000 last year, and a first class ticket in row 5 should be in boarding group 1. The software determines which of rows 402a-e and 404 correspond to these inputs and outputs and creates a corresponding column 406a in the table 400. This can be repeated for as many test cases as a user wishes to enter. In some cases, the software may provide an interface offering each potential input or output variable to the user so that the user can merely enter or select values without having to know what variables need them.

The user can then fill in test cases and execute a test. At that point, the software evaluates the rule for each line of the test dataset table and computes the resulting value. If the resulting value matches the expected value (the value entered by the user in the column corresponding to the output variable), an indication is given that the rule is valid, for example, the output cell may be shown in green. If the resulting value does not match the expected value, this is indicated, for example, the cell may be shown in red and both the expected and the actual value are displayed. The user can then update the test case or fix the rule. Other user interface mechanisms can of course be used. For example, rather than comparing computed outputs to input expected outputs, the test procedure may simply display what the computed output would be, and let the user evaluate whether that is correct.

In some examples, users have real data that they can use for generating test data. The ultimate users of the business rules may provide such data to the developers to use in testing. To handle cases where the users do not have real data to test with, the software may provide a simple data entry form for entering test data one record at a time. The user can type in values for each of the fields in the input dataset and those records will be added to the identified test dataset.

In some examples, rules are validated as they are entered, and a rule that does not produce the expected output can be identified immediately in the interface, similarly to how a word processor may mark misspelled words as they are entered.

In some examples, after a test has been performed, the user can select any row (test case) in the test dataset table. If a row is selected, the corresponding row in the rules table that produced output for that test case will be displayed. In addition to expressions, users can attach comments to any cell in the test dataset table.

More on Rule Sets

As noted above, a transform is generated from a rule set. A rule set may have the following attributes:

A name, description, and comments—these help to identify a rule set. Depending on the back-end implementation, a rule set may include an identification of its location within the system. In some examples, a rule set's location is a path in a project. In some examples, rule sets may be organized in a relational database and located by name. A modification history includes modification names, dates, and check-in comments.

A transform type—this determines what type of transform is generated from the rule set. Possible values include reformat, join, rollup, and filter, as discussed below.

Input datasets—these provide a list of fields and named constants for editing. In some examples, when the transform is generated it will assume the record format of one of the input datasets by default. There may be multiple input datasets, allowing the rule set to generate transforms for different environments. This also allows multiple sets of logical to physical mappings, i.e., different sets of physical names. In some examples, there in an input mapping table with one or more datasets. In some examples, a join component may have multiple input mapping tables, and each may have multiple datasets.

Output datasets—these provide a list of output field names. By default, when the transform is generated it will assume the record format of one of the output datasets. The output dataset can be the same as the input dataset. Included rule sets will not have an output dataset. In some examples, as with input datasets, there are multiple output datasets, allowing the rule set to generate transforms for different environments.

A list of included rule sets—one rule set can use the output fields computed by another rule set (explicitly listed output fields, not fields of the output record format). Output variables in the included rule sets may be used as variables in the including rule set, based on an included rule set mapping table that defines the set of output variables from an included rule set that are visible in the including rule set.

A list of included transform files—one or more files that specify transforms to be used when processing a rule set can optionally be included.

A series of mapping tables that list the variables and constants—these tables are intertwined with the input and output datasets. They make the list of variables known to the editor and document the mapping between business names and technical (DML) names. Each variable has a business name, technical name (DML expressions), and base type (string, number, date or datetime). Associated with each variable is an optional list of constants that documents the mapping between business name and DML constant value. The variable tables are described in more detail below.

References to external test data files—Test files are used for testing the rules, similarly to the embedded test datasets discussed above.

A No-reject flag—if this flag is set, then the transform produced by the rule set will not reject records (throw errors). This may be used so that a rule that throws an error will be ignored, as if that rule never triggered.

A deployment table—this lists one or more deployments, which indicate (indirectly) which rules should be included in each build. The deployment table is described in more detail later.

An optional key—this lets users specify the business name of a special input field that represents the key for join-type and rollup-type rule sets. In some examples, the key is actually implemented as an entry in the table of input variables, with a type of key.

An optional list of lookup files—this provides business names, key information and a complete table of input variables and constants, one table per lookup file. Lookup file support is described in more detail below.

A table of parameters—this lists variables whose value comes from the environment or from a parameter set at runtime.

Tables of Variables and Constants

As noted, each rule set has an associated set of tables of variables and constants. In some examples, these tables are private to the rule set and cannot be shared between rule sets. The tables of variables and constants are used for several purposes:

1. As the definitive list of input variables used by the rule set and output variables produced computed by the rule set.
2. As a list of business names available during editing. While editing, the system will present a suggested list of business names for variables and for constants. This list comes from the tables of variables and constants.
3. As a mapping table to translate business names to technical names. The rules will include business names (in text, inside of DML pre-processor directives as described later). When the transform is created, the business names get replaced by technical names or DML expressions. Some of the tables, like the input variables and the output variables, can have multiple datasets each with different technical names for the business names. The translation used depends on the deployment (detailed later).

A rule set will have several different tables. The tables are similar in most ways but there are some slight differences. The tables include:

1. A table of input variables and constants. For transform-type rule sets, this table contains the fields in the input record format that will be referenced in the rules. Not every field in the record format needs to be listed, but they usually are. With a Join-type rule set, there will be multiple input tables, with each table representing one input dataset for the join operation.
2. A table of input variables and constants for all included rule sets. When using included rule sets, each included rule set has its own table of input variables and constants. When a transform is built, the input variables used by included rule sets must be mapped to actual inputs in the context of the rule set doing the including. Therefore, this list is promoted to the including rule set. If multiple included rule sets are included, each input variable table is promoted. (If an included rule set itself includes a rule set, the second-level variables are not promoted.) Input variables and constants promoted from included rule sets are not available for use in the including rule set. This table is only included so a mapping can be established between the inputs to the included rule sets and the inputs to the including rule set. See below for more detail.
3. A table of output variables and constants for all included rule sets. When rule sets have been included, the outputs of those included rule sets become inputs to the including rule set. This table lists all those variables. It is initially populated directly from the table of output variables and constants in all the included rule sets; however, the business names can be changed to avoid name collision. For this table, the technical name is really the business name inside the included rule set.
4. A table of output variables and constants. For transform-type rule sets, this table contains the fields in the output record format that will be calculated by the rule set. Output variables that are not calculated can also be included and will be ignored by the rule set. (The generated transforms have a wildcard rule to copy inputs to outputs. In addition, the outputs could have default values included).

Output variables can also be used as intermediate variables, meaning the value of an output produced from one rule can be referenced in a later rule. Sometimes the output is only used in this way; it is never directly included in the output record from the transform.
5. A table of parameters. rules may include references to parameters. Parameters are resolved at runtime in the context of a graph's parameter set. Like other variables, in a rule set a parameter has a business name, a technical name (e.g., $RUNDATE) and a type.
6. A table of variable mappings for each lookup file. These are similar to the input tables, but map to fields in the record format for the lookup file.

Non-shared rule sets (which are designed to produce transforms) are usually tied to both input and output datasets. The input dataset is the source of input variables. The output dataset is the source of output variables. Sometimes a rule set will have multiple input datasets and/or multiple output datasets. In that case, each input dataset and output dataset is a possible input or output of the transform. There will only be one set of input variables (except for join operations), but there may be a different mapping between business names and technical names for the different datasets. In some cases, an input variable may be used by the rule set and be present in one input dataset but not in a second input dataset. In that case, a DML expression must be specified as the technical name of the missing variable in the second input dataset. If the rule set does not use an input variable, there is no need to supply a technical name for every input dataset.

Likewise, there may only be one set of output variables. If a given output dataset does not have field corresponding to an output variable (i.e. there is no technical name), then that output will be ignored when generating the transform for that output dataset.

Included rule sets are treated somewhat differently. Included rule sets do not have associated input and output datasets. Instead, they just have input variables and output variables. The rule set that includes a included rule set is responsible for mapping the input and outputs. This is described in more detail later.

Variables

Variables may have the following properties, and may be presented to the user in tabular form:

1. The business name (logical name). The business name is the name used in rules. In some examples, restrictions are imposed such that no two input variables can have the same name, no two output variables can have the same name, no two outputs from included rule sets can have the same name, and no two lookup variables in the same lookup file can have the same name. An input variable can have the same name as an output variable. In such a case, the user interface may disambiguate the input and output based on context or by using a prefix such as "out." in front of the output variable name. Lookup variables in different lookups file can have the same name. In that case, using a prefix such as the name of the lookup file itself will disambiguate them.

2. A simple type. In some examples, four basic types may be supported—string, number, date and datetime. These correspond to DML types string(int), decimal(20), date ("YYYY-MM-DD") and datetime("YYYY-MM-DD HH24:MI:SS.nnnnnn"). Conversion between the basic type and the actual type used in the transform will be handled separately from the editing of the business rules, for example, by the generated transform component.

3. A default value. The default value is only needed for output variables. This is the value that is used when (1) there is an empty cell in an output column in a rule for that output, or (2) when no rules trigger to compute a value for that output. Default values can be NULL (and an empty cell is interpreted as NULL), as long as the output variable is nullable.

Default values are expressions, just like the expressions that are used in output columns in a rule expression table. This means that default values can refer to input variables or output constants or contain expressions. Default values can also refer to other outputs, as long as no circularities are introduced.

4. A technical name (physical name) or expression. This is the expression that specifies the variable. It is possible to use a expression instead of a field name for input and included variables (in some examples, using expressions is not allowed for output variables). In the case of vectors, the expression should be fully qualified.

When dealing with prompted variables and input and output variables from included rule sets, the technical name associated with a variable is really just the business name used inside the shared rule set. When dealing with output variables that are only used internally (intermediate variables computed in one rule and used in a subsequent rule), the technical name can be blank.

5. An optional description and comment.

Constants

The various tables of variables include mapping for constants as well as variables. Constants correspond to enums in C++. The software may support constant values that initially come from valid values and invalid values, and constant ranges that initially come from valid and invalid ranges. Additionally, it is possible to create constants that represent sets of distinct values and/or ranges.

Constants are associated with variables. This means that the business names of constants do not have to be unique across the entire rule set. The editor will normally know the context for any constant based on which column in the rule the constant appears in; however, it is possible for the user to select a constant belonging to a different variable in expressions. In that case, the constant will be qualified with the variable name (e.g., "Airline class.business").

When computing output variables, only single value constants are used (it makes no sense to assign a range to an output field).

Constants have the following properties, and will be presented to the user in tabular form. (variables and constants may be intermingled, similarly to embedding a table inside another table).

1. The variable name. All constants apply to exactly one variable. The variable name is actually part of the associated variable itself.

2. The business name. The business name is the name used in rules. The name does not have to be a value identifier, specifically, internal spaces and punctuation are allowed. Business names for constants only have to be unique within the variable they apply to.

3. The constant type. One of value, range, or set. As mentioned earlier, ranges and sets are only legal when used in comparisons (inputs), not in assignments (outputs).

4. For values: the actual value. In the present example, strings should be in quotes and numbers should not be. Dates and date-times should be in quotes in the default forms (e.g., "YYYY-MM-DD"). Using an expression is also allowed as long as that expression returns a simple type that can be automatically converted to the variable type.

When a constant is part of the table of inputs or outputs for an included rule set, there is no value. Instead, the value is the business name of the associated constant for the corresponding input or output variable.

5. For ranges: the minimum and maximum values. Both are constants or expressions, just like the actual value documented above. Ranges are used as shorthand for comparison in rules. Only equality comparisons are allowed for ranges, and the software will translate ranges into "variable>=minimum and variable<=maximum". If the minimum is not specified, that part of the comparison will be skipped. Likewise for the maximum. The range is actually stored with a comma separating the minimum and maximum values.

6. For sets: a comma separated list of the values. Each element of the list is a constant or expression, just like the actual value documented above. Only equality comparisons are allowed for sets, and the software will translate sets into an expression in the form of "variable member of [vector list of values]".

7. An optional description and comment.

When dealing with promoted variables from shared rule sets, constants are also promoted. In the tables that show the input and output variables for shared rule sets, constants associated with those variables are also shown. The default mapping for those constants is part of the promoted information, but the user can override the constant values.

The software will detect when there is a possible conflict in the use of variables because of mismatching constants. Specifically, if (1) the value of any variable is copied into another variable, and (2) if both variables have constants defined, and (3) the set of constants are not identical in both name and value, then an error will be generated that the user needs to translate the value of one variable into the values of the other. Source variables include input variables, lookup variables, outputs from included rule sets, and output variables used as inputs. Target variables include output variables and inputs to included rule sets. Assignment can happen in rule expressions or in variable tables.

Naming Restrictions

All things that can be used as inputs generally need to have names that are unique within the entire rule set. This includes business names of input variables, business names of parameters, and business names mapped to the outputs of every included rule set. For join operations, input variables in different sets of inputs can have the same names. They may be disambiguated, for example, with a prefix corresponding to a business name for the input set.

Output variables also have to be unique. However, output variables may have the same name as input variables. If an output variable has the same name as an input variable, and the variable name is used in a place where input variable names are allowed (like in a trigger column for a rule), then the input variable is assumed. To use the output variable instead, the name needs to be qualified, for example, by entering "out.<variable-name>" when entering the variable name. This is interface notation only—the internal representation of variables is unambiguous.

There can still be ambiguity between variables and constants that have the same name. In that case, the software will favor a constant when in a context where both a constant and a variable with the same name make sense. The user can override that by qualifying the variable name using, for example, the syntax "in.<variable-name>."

In some examples, business names are assumed to be in UTF-8 so they can include international characters. Business names can include spaces, periods, parenthesis, etc. However, in such an example, business names are not allowed to include any character between 0x00 and 0x31 (the control characters). All business name matching is case sensitive, though the user interface may allow the user to enter business names with the wrong capitalization and then suggest the correct capitalization, for example using an auto-complete mechanism Ordering of Variables To avoid circular logic, the software enforces a strict ordering of variables and rules. The global ordering is as follows:
1. Input variables and Parameters.
2. The 1st included rule set's input mappings.
3. The 1 st included rule set's output values.
. . .
4. The Nth included rule set's input mappings.
5. The Nth included rule set's output values.
6. The 1st lookup file's default key values.
7. The 1st lookup file's output fields.
. . .
8. The Nth lookup file's default key values.
9. The Nth lookup file's output fields.

10. All output variables' default values.

The calculation of each item uses values computed in previous steps. This means, for example, that the first included rule could refer to input variables and parameters in its mapping table. The second included rule, however, could map its inputs to outputs computed from the first included rule. Similarly, the default values for each output variable are computed before any rules, so they are based on the values of input variables, parameters, lookup files, or outputs from any included rules. When it comes time to actually calculate the output of the rules, the rules are evaluated in order so later rules can use the values computed from earlier rules.

Linking Datasets to Variables

In some examples, the table of input variables comes directly from the input dataset record format and the business names come from the metadata on the input dataset. However, in some examples, there are advantages to having a copy of this mapping inside the rule set. First, having a copy of the variables mapping table in the rule set makes it possible to edit the rule set outside the context of the production environment. The rule set and associated rules could be serialized into a sandbox and edited as part of a sandbox project. Second, having a copy of the input variables mapping table makes it possible for the user to resolve conflicts or otherwise override the existing metadata. For example, if two fields in the input dataset map to the same business name, one of those business names could be changed in the table of input variables.

When a rule set is first created, the input variable table is empty. As soon as the user identifies the input dataset, the input variable table is populated, automatically, from the metadata of the input dataset. (The same logic applies to the output variables and output dataset, but the rest of this discussion will focus on the input dataset for simplicity).

The singular term "input dataset" is used in this description for simplicity. There are zero or more input datasets that can be linked to input variables, and a separate set of zero or more input datasets that can be linked to output datasets. Specifically, the input variable table has one column for the business name, one column for the type, etc. and many columns for the technical names, one per input dataset. Once a single input data set is specified, a second can be added using similar technique. However, in the case of a second or subsequent dataset the mapping between technical name and business name may be less complete, especially since the system may not be able to figure out which variable each field in the second and subsequent dataset maps to. In such examples, the user can manually correct any missing information.

When initially creating the input table from an input dataset, each field in the input dataset will cause one input variable to be created. The technical name for the input variable will be the name of the field. The type will be assigned based on the field type. Voids will be treated like strings, reals will be treated like numbers. Subrecords will not have corresponding input variables although the fields inside subrecords will. Unions will result in input variables for each branch of the union. If an element is a vector, the technical name of the corresponding input variable will assume the first element of the vector ("in.vect[0]"). The user can override this. For example, in the normalize-type transform, the user may change the technical name to be in.vect[index]. Or, the user may create additional input variables corresponding to other elements of the vector, if the vector is fixed length. Unions and vectors may not be supported in output datasets (no output variables will be created for them). In some examples, a variation of the normalize component may output an output vector instead of multiple output records.

In some examples, the business name is computed from the metadata. The logic for determining the business name for a field is as follows:
1. If the field (Physical Element) has a display_name, then the display_name of the field is used as the business name.
2. Otherwise, if the field has a Logical Element and the Logical Element has a display_name, the display_name of the Logical Element is used as the business name.
3. Otherwise, if the field has a Logical Element, the name of the Logical Element is used as the business name.
4. Otherwise, a business name is computed from the technical name.

If there is a conflict (duplicate name), then only one business name will be assigned. The other fields will not be assigned any business name.

In some examples, there is no dynamic linking between rule sets and dataset metadata. If users change the metadata data (for example, renaming a Logical Element), that change is not automatically picked up by the software. In some examples, a two-way relationship between data may be used to allow such changes to be detected.

If a user adds a second dataset to rule set, the software will try to fill in fields for each of the business names using the same physical to logical mapping rules as listed above. If a variable cannot be mapped, the technical term for that variable will be left blank for the added dataset and the user will have to fill in a field name or expression manually. Available fields will be listed in a pull-down in the user interface.

At the same time that the input variable table is created from the dataset metadata, constants may be added to the input variable table, also from the dataset metadata. The software will create constants for all valid and invalid values and all valid and invalid ranges associated with the Validation Spec associated with each Logical or Physical Element.

The logic for determining the business name for a constant is as follows:
1. If the valid value (valid range, etc) has a display_name, the display_name will be used as the business name.
2. Otherwise, if the valid value (valid range, etc.) has a description, the description will be used as the business name.
3. Otherwise, the constant will be included in the variable table without a business name.

It is not necessary to create variables starting with datasets. A second way to create a list of input variables is to identify a Logical Entity in the underlying system. If a Logical Entity is selected, then the software will create a table of variables with one variable for each Logical Element in the Logical Entity. The business names of the variables will be the display_name of the Logical Elements. If the Logical Elements have Validations Specs, constants will also be created using the previous document rules.

Finally, input and output variables can be added manually, either by adding them to them the variable table or by creating them while editing rules. For example, when a user adds a column to a rule, he selects which input variable should be used for that column. But he can also select "new . . . " and create an input variable on the fly. The software will then prompt the user for a datatype and optional comment. No technical name needs to be filled in until later.

The software needs a list of variables in order to allow rules to be edited. However, the mapping between business names and technical names does not have to be completed until later. The mapping is only needed when the user is ready to either test the entire rule set against an external test file or actually create a transform from the rule set.

Included Rule Sets

In some examples, rule sets can be shared. Specifically, an included rule set is designed to be included inside another rule set so that its logic becomes part of the including rule set's generated transform.

Although included rules sets are usually designed specifically to be shared, a included rule set can also be used standalone to create a transform. For example, a user could create a rule set that computes a Boolean output for a filter-type transform. But at the same time, that rule set could be included inside another transform and the Boolean output (an output variable of the shared rule set, available in the including rule set) could be used to compute a more complex output.

Included rule sets are similar to other types of rule sets. They have input variables and output variables. And they can, themselves, include other included rule sets. But the handling of input and output variables in included rule sets is different than with transform-type rule sets. In transform-type rule sets, the input and output variables are mapped to technical names so a transform can be generated. But in included rule sets, there is no need to map input and output variables to technical names. (If a rule set is both shared and used to generate a transform, then the inputs and output variables will be mapped to technical names for the deployments that generate a transform).

When a user includes a included rule set into another rule set, the including rule set needs to have variable mapping tables to map the inputs and outputs of the included rule set. In the context of the including rule set, only the input variables and output variables of the shared rule set are visible. Any variables of any rule sets included in the shared rule set are not exposed to the including rule set.

In the context of the including rule set, the input variables of the shared rule set need to be mapped to variables of the including rule set, or expressions using those variables. The business names of the shared rule set will be listed in a variable mapping table, but those names will not be available to be used in rules in the including rule set. Instead, the including rule set only needs to match each input variable (by business name) of shared rule set to an expression in the including rule set.

Included rule sets are considered to be evaluated before input variables, parameters and lookups so the output of an included rule set can be used as the key for a lookup. In some examples, the order of evaluation is more flexible and the ordering of lookups vs. evaluation of included rule sets can be automatically determined based on a dependency analysis. Because included rule sets are evaluated before any output variables are computed, no output variables in the including rule set can be mapped to inputs in the included rule set. If the mapping to an included rule set input cannot be done with a simple input variable, an expression can be used instead.

The mapping to an included rule set input variable can be NULL, as long as input variable in the included rule set is nullable. The mapping can also be left blank. If the mapping is left blank, then an error will be reported at transform generation time, if and only if that input variable is needed in the computation of the including rule set's outputs. In some examples, it is assumed that everything is nullable, which simplifies the user interface.

In the context of the including rule set, the output variables of the shared rule set also need to be mapped to business names in the including rule set. This mapping table is the reverse of the one above. When mapping a shared rule set's input variables, the table maps the business name of the shared rule set's input variable to an existing variable in the including rule set. But when mapping the shared rule set's output variables, the including rule set has a table that specifies a business name for the outputs of the shared rule sets—mapping names in the including rule set to the corresponding names in the shared rule set.

The output variable mapping is needed to resolve potential naming conflicts. The default mapping is to simply use the same business names in both the including rule set and in the shared rule set. But the names of output variables in the shared rule set may conflict with the business names of variables already defined in the including rule set, so the mapped named in the including rule set can be changed.

Not every output from the shared rule set needs to be mapped. If an output is left unmapped, that output cannot be used in the including rule set, and the corresponding logic from the shared rule set will be ignored. On the other hand, all of the inputs from the shared rule set should be mapped, although they can be mapped to uninteresting variables if the rule set designer is sure that they will not be needed. In some examples, the system itself may determine which inputs really need to be mapped.

In some examples, the mapping table is done by business name, not by reference. When a shared rule set is included in another rule set, the including rule set gets a copy of the input and outputs from the shared rule set. These names are stored in the including rule set along with the mapping information. It is possible that the shared rule set gets changed, causing some inputs or outputs to be added, deleted or renamed.

Referential integrity problems between including and included rule sets can be handled by the including rule set when that rule set is loaded from the system. Input variables that disappear from the shared rule set are deleted from the including rule set. Input variables that get added to the shared rule set are added to the mapping table in the including rule set, but remain unmapped. Likewise, output variables that get added to the shared rule set get added to the mapping table in the including rule set, but remain unmapped. If an output variable gets deleted from the shared rule set, and it is not used in the including rule set it is just deleted from the mapping table, but if it is used in the including rule set, the user gets an error that the variable is no longer available.

The including rule set actually persists redundant information from the shared rule sets. Specifically, in the input and output variable mapping table, the including rule set only needs to maintain a list of the business names in the shared rule set along with the corresponding named in the including rule set. For efficiency, the including rule set also persists the type, default value, description and comment, all copied out of the shared rule set. These values are read-only when editing the including rule set but are included for efficiency for generation of reports and other analysis.

The shared rule set mapping tables also have one additional entry in the included rule set, which is an additional comment. This allows users to add another comment to the mapped value.

Constants for Shared Rule Sets

Included in the mapping table for included rule sets are the constants for the shared rule set's input and output variables. As with the variables themselves, the constants used by the shared rule set may have to be mapped. For input variables, the shared rule set may internally compare field against constants, defined in its input table. When the shared rule set is included in another rule set, the constants for its input variables are copied over to the including rule set. The user can then override the values in the context of the including rule set. Usually, when the user defined a mapping between the shared rule set input variable and a variable in the including rule set, the constants between the two variables will match up. If this is not the case, the user will need to supply a technical value for any constant value defined by the shared rule set.

Lookup Files

Rule sets can optionally have one or more lookup files. Each lookup file in a rule set includes the following information:
1. The Business name of the lookup file.
2. An optional description and comment.
3. A list of the business names for the fields that make up the key. These names are used when the lookup file is added to an expression so the user sees something like this: lookup(My Lookup File, <customer name key>, <account type key>).
4. A list of default expressions for each of the keys.
5. The technical name of the lookup file. In some examples, this can be overridden in the deployment.
6. One or more lookup datasets. Each lookup file is loosely tied to a dataset within the system just like rule sets are tied to input datasets. By default, there is one lookup dataset associated with each lookup file in the rule set, but there can be more lookup datasets for use in alternate deployments.
7. A table of input variables and constants. This is just like the table of input variables and constants for rule sets except that there is one table for each lookup file. As with input variables, the table of input variables and constants for lookup files can have multiple technical names, corresponding to each of the associated lookup datasets.

Lookup files are handled just like input variables, except that there may be more than one lookup file. Each lookup file is edited on one page, has a mapping table between business names and technical names and can be associated with multiple datasets. They also have constants associated with each field. The mapping for a lookup file can be initialized by reading the metadata for a lookup dataset just like the metadata for input variables is loaded form an input dataset.

If a user uses a lookup field variable, and the key is not found in the lookup, the value of the field is assumed to be null. Unless the rule case specifically triggers if the field is null, the rule case will evaluate as false and be skipped. In such a case, no error is generated. If a user uses a lookup file variable (the lookup file itself and not a field), then the function lookup_match is assumed so the lookup file variable evaluates to true or false. Both cases apply to rule expressions for either input or output columns. If a user uses a lookup field variable as an output variable default, a failure to find the lookup is translated into a NULL.

Parameters

A rule set may refer to parameters. In some examples, each rule set has an optional parameter table, which, like a variable table, maps the business names of parameters to their technical names. Each entry in the parameter table has the following attributes:
1. The business name. This is the name of the parameter, as it will appear in rule bodies. In general parameters can be used anywhere an input variable is used.
2. The technical name. This is the name of the parameter in the development environment.
3. The type of the parameter (string, decimal, date or datetime). In the generated transform, parameters may be converted into other types as needed.
4. An optional description and comment.

Parameters are like variables except that their values are constant across the entire input file, and their values are specified externally when processing starts.

Testing Rules

Part of generating or updating a transform is testing the rule to which it will correspond. Rules are also validated, that is, checked for syntax and semantic consistency. In contrast to validation, testing involves execution of the rules and correctness is determined by the user, for example by providing expected output or comparing the output to expected values manually.

The software supports testing at two levels. As described earlier, each rule may have an associated test dataset, in the form of an embedded table of values and expected results. This is referred to as unit testing. When editing a rule, it is possible to re-evaluate the rule's outputs for each line of test data. Any mismatches between actual results and expected results or failures to produce valid results are highlighted for resolution.

In some examples, external input test files are accessible to the server process using standard mechanisms. Testing using external files is referred to as file testing. A test file has a record format that matches the input dataset for the rule set. In some examples, an alternate record format may be provided. Optionally, users can identify a dataset that contains expected results. The software runs the rule set against the test dataset and displays what outputs were produced, and why. If expected results were included, the software compares the actual results against the expected results and lists any records that were different. In some examples, the interface can be extended to allow the user to incrementally retrain individual values.

Some differences between unit testing and file testing include:

1. For lookup files: in unit testing mode, for each test case, the value for each lookup variable is defined as part of the test. No key is specified; when the test runs, the same value is assumed, for each test case, for each lookup variable. A test dataset contains multiple test cases, and each test case can specify a different value for each lookup variable. In file testing mode, real lookup files are used. This means that different keys will return different values, but it also means that the value used for any given lookup variable for a specific key cannot be changed during the test
2. For included rule sets: in unit testing mode, included rule sets are not executed and do not even have to be complete. Instead, a value is specified in the test dataset for each output from each included rule set. In file testing mode, included rule sets are executed the way they would be executed in production. This implies that any lookup files or parameters needed by the included rule sets also have to be specified at test time.
3. For parameters: in unit testing mode, a different value can be set for each parameter for each test case. In file testing mode, the value of each parameter is constant for the entire test.
4. For the current date: when testing, the user specifies the value that should be assumed for the current date and time, in case the rules refer to the current date or time. In unit testing mode, the date and time can be different for each test case. In file testing mode, a single date and time value is set for the entire test (this value can be different that the date and time of the machine at the time the test is run).
5. For record formats and mappings: no mapping needs to be specified for unit testing; the testing is done entirely based on the business names of variables. For file testing, all the variables are mapped to technical names and the record format for inputs, outputs and lookups is specified.

Figure 4A:
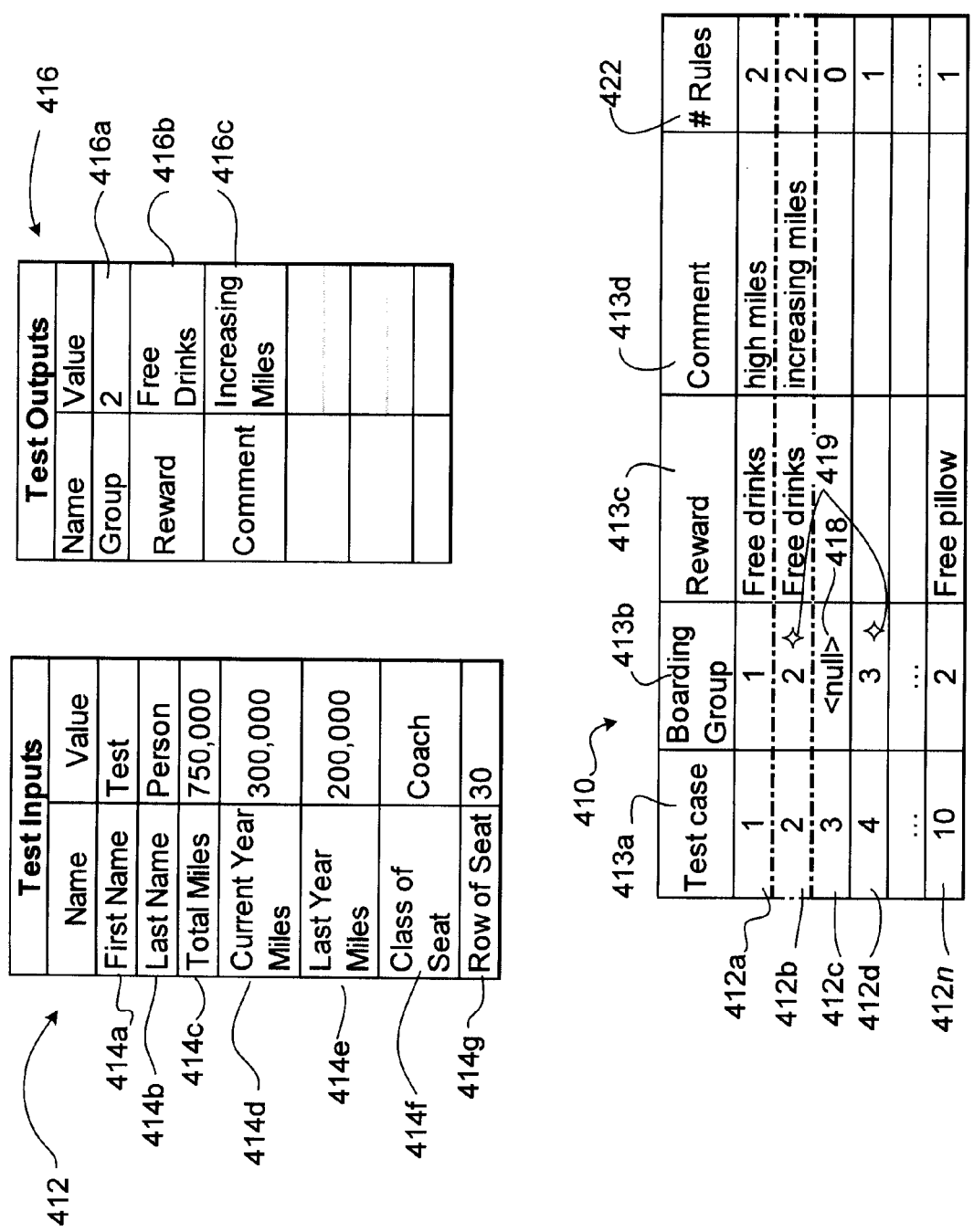
FIG. 4A is test results.

In the example output screen of FIG. 4A, a results table 410 is shown in which the output for each test case is displayed in a separate row 412*i* with columns 413*a-d* showing the test case and the outputs calculated for each. When one row 412*a* is selected (shown in FIG. 4A by a dashed line), the input values 414*a*-414*g* from the corresponding test case are shown in an input table 414. The outputs 416*a*-416*c* for that test case are shown in an output table 416. The outputs 416*i* shown in the table 416 could be the expected outputs from the test case, the actual outputs computed, or both. Various interface cues can be used to inform the user about the status of the test. For example, icons 419 indicate that the output in rows 412*b* and 412*d* for test cases 2 and 4 have changed since the last time the rule set was tested. If there is no "default" rule to catch combinations of input values that don't match any other rule, test cases having such inputs produce a null output 418. If an input record is rejected with a processing error, such as division by zero, an error may be indicated in the same way. If more than one rule case is triggered by a test case, the number of triggered rule cases may be indicated (422). By interacting with one of the displayed outputs, for example, by clicking on it, the user can be taken to a screen that details how that output was determined, as shown in FIG. 4B.

Figure 4B:
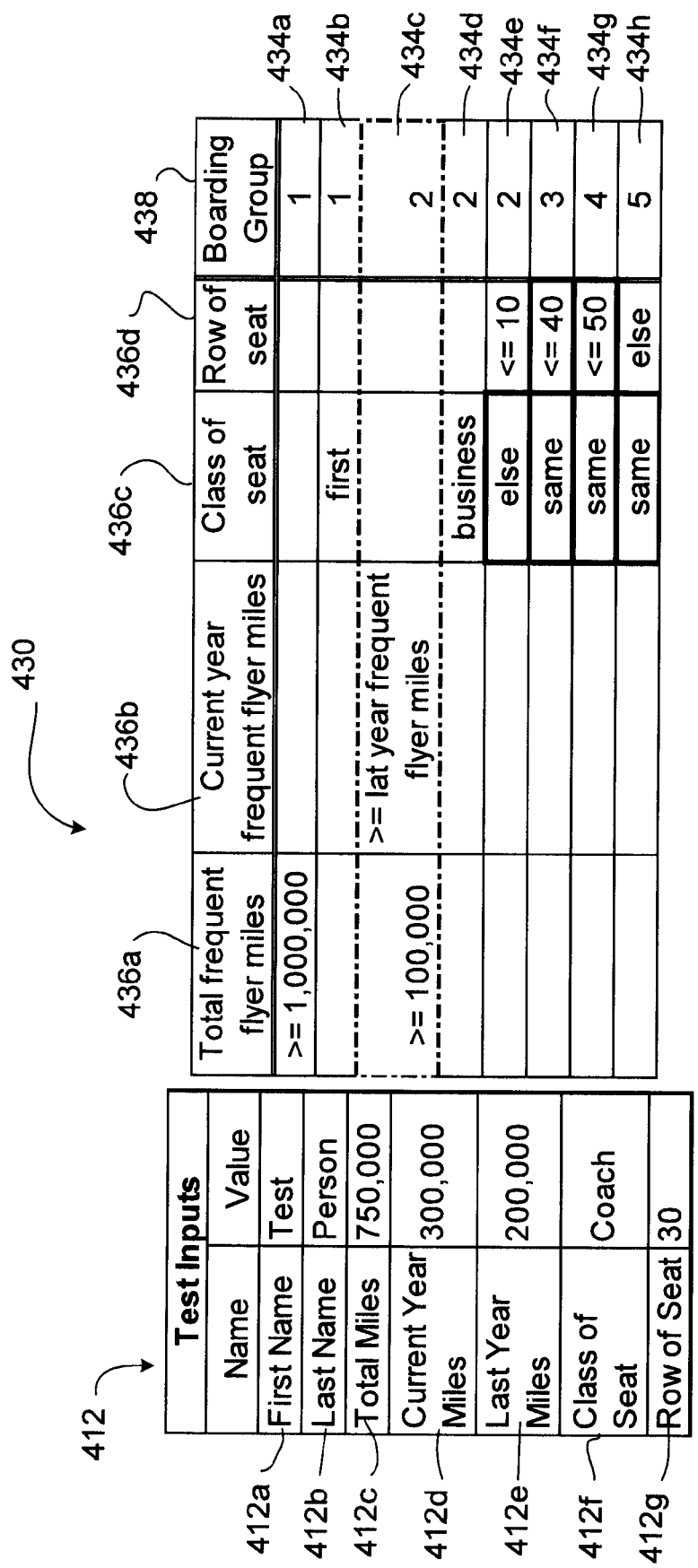
FIGS. 4B and 4C are details of test results.

In the example output screen of FIG. 4B, a table 430 displays a rule for a single test case 412 from FIG. 4A and indicates with a dark border each input criteria 436*i* that was true in any rule case 434*i*. For example, in the sixth rule case 434*f*, the cells containing values for the third and fourth inputs 436*c* and 436*d* are highlighted because the values 412*f* and 412*g* for these inputs in the test case 412 match the values in the rule case (class is not first or business, row is <=40). In practice, any of a variety of graphical techniques may be used to differentiate true and false cells, such as highlighting, colors, fonts, or borders. The first rule case in which all values are matched with the test case, rule case 434*c*, is indicated by a dashed border as the rule case that triggered the rule and produced the output indicated in line 412*b* in FIG. 4A. Displaying not only the triggered rule case 434*c* but also the other rule cases allows the user to quickly determine what rule cases applied and what changes would be needed to achieve a desired output. In some examples, multiple rule cases that could have been triggered (e.g., if higher ones had not been) can be indicated. The output that would be generated by each rule case (if it were to have been triggered) can be shown in column 438. These features may assist, for example, in debugging the rule case.

Figure 4C:
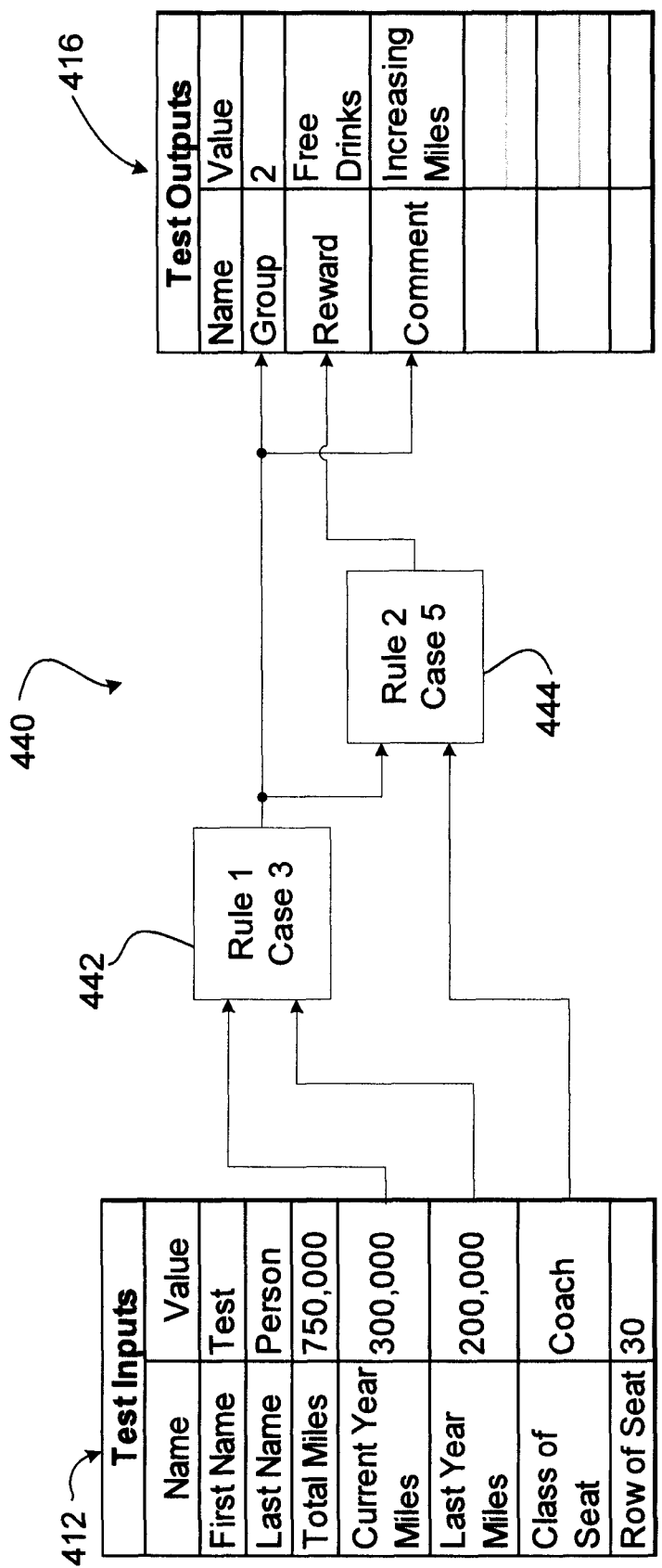

In some examples, the outputs of one rule set may be inputs to another rule set. How a given test case is evaluated by the rule sets in such a case may be shown graphically as in FIG. 4C. In this graphical representation 440, the business rule that put the test case traveler from FIGS. 4A and 4B in boarding group 2 is shown as a box 442 receiving inputs from the test case table 412 and providing outputs to the output table 416. In this example, a second business rule indicates that a traveler whose miles per year are increasing should be rewarded. That rule receives as input the determination from the first rule that the miles are increasing, in addition to the inputs from the test case, and is shown as box 444. Because the flyer is in coach, this rule gives the customer free drinks. (If the customer were in first class, she would already receive free drinks, and a different reward would be in order). In some examples, clicking on the displayed rules may take the user to the display of how that rule was triggered, as shown in FIG. 4B for the first rule 442.

Figure 5:
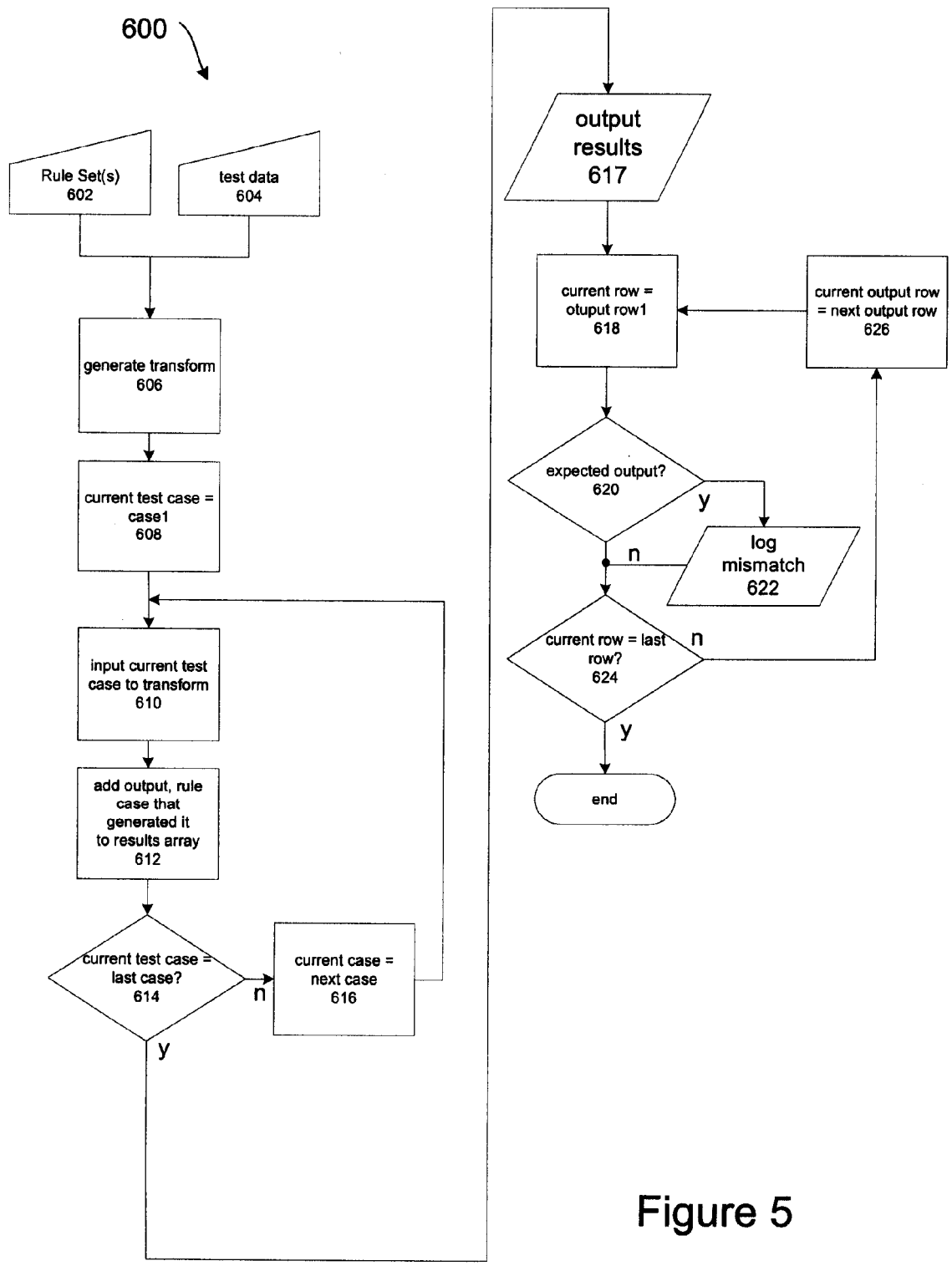
FIGS. 5 and 7 are flow charts.

Rule sets are tested and validated using the process shown in FIG. 5. One or more rule Sets 602 and corresponding test data 604 are the inputs to this process. The software generates a transform (606) based on the rule sets and uses it to compute output values for every record in the test data. In a graph computation, a "log" port of the relevant component is used for testing outputs. The transform generated for testing may be slightly different than the transform that would be generated for execution. At test time, an additional output is added to the output record. This output is an array that contains identifications of rule sets that actually generated outputs and which rule cases within those rule sets were responsible for the outputs. Multiple outputs could be generated for each test case, i.e., different outputs from different rule sets. This array is used to generate the output tables shown in FIGS. 4A and 4B, discussed above. In some examples, the test output is more complex than a simple array. The output includes the value of every input for a given record, the value of every parameter, the value of every output from an included rule set and the value read from every lookup file (including indicating which key was used for the lookup).

Beginning (608) with the first test case, the inputs of the test case are input (610) into the transform, and the output is written (612) to the output array, together with an indication of which rule generated it. This process repeats for each row (614, 616) until the last row has been evaluated (614). The output array can then be used to generate (617) the results tables 410 and 420 discussed above. The output array may be is evaluated to determine if the rule set is valid, as shown in the remaining steps in FIG. 5. Output values may be included in the test data for the generated output values from one test may be compared to the values generated in a previous test. Beginning with the first row of the output array (618), the generated output is compared (620) to the expected output from the test data 604 or previous test results 617. If any output does not match, the mismatch is logged (622). This repeats for each row (624, 626). In some examples, the evaluation steps are integrated into the output-generating steps, and each generated output is compared to the corresponding expected output as it is generated. Any mismatch or other error in processing the test data results is logged. As noted above, the outputs of one rule set may be inputs to another rule set, in which case the included rule set is evaluated as part of the including rule set.

Users can limit the rules that are tested by output field. In some examples a user can choose to disable a rule during testing. In some examples, users do not have to wait for the whole test file to be processed; test results are available as soon as the first few records work their way to the output.

In addition to the test data itself, any of the following information may be used for file testing and can be included as part of the rule set:

1. Physical Location of the input dataset. This is stored in the rule set in the input variables table for each input dataset. For join-type datasets, all the Physical Locations are needed. Whenever a physical location is needed, a table name in a database may be used.
1. Record format of the input dataset. By default, this is taken from the dataset definition for the input dataset. There is a place in the input variables to override this with a different record format checked-out into the sandbox. For join-type transforms, all the record formats are needed.
2. Which deployment to use.
3. Physical Location for all lookup files. This is stored in the lookup files table.
4. Record format for each lookup file. Taken from the dataset definition associated with each lookup file, or from an override record format file.
5. Value for each parameter. This will be set in a test parameters dialog.
6. Physical location for the output file. This is only needed when doing regression (comparison) testing. It is stored in the output variables table.
7. Record format for the output file. Once again, only needed when doing regression testing, and taken from the output dataset definition or from an optional override record format file.
8. Location of the project sandbox. Testing must be done out of a sandbox on the host. The sandbox should be a checked-out copy of the project that contains the rule set. All the record format files will be taken from the sandbox.
9. Value to use for the date and time when a rule refers to "now," "today," or similar values.

There are three possible transform types: one with no logging, one with logging of all inputs, output, rules executed, etc., and one which additionally includes details about which cells in each rule are false or null. Testing can use either of the latter two types of logging. If the transform does not log cell state, this is simply not shown in the user interface. Logging inputs, outputs, etc., slows down execution but only by a small amount. Logging cell state slows down execution a lot, perhaps by as much as an order of magnitude.

When not testing, the user can still generate a transform that logs inputs, outputs, etc., and use that transform in production. The enhanced transform generates the same outputs but also generates a series of log messages that can be analyzed, post-execution, to determine which rules were executed. If the user saves the logs generated, then the Business Rules Environment can be used after the fact to replay the execution of the rule set in production, by using the information in the log to compute the information in FIGS. 4A, 4B and 4C, even though no testing input was used. We call this execution playback and it is useful for auditing.

Overlap Analysis

In some examples, as mentioned above, when the user runs the test dataset against the rule set, every rule that triggered can be tracked, that is, rule cases that had all their input conditions met and would have produced output if a higher-priority rule case had not also had all its input conditions met. After processing the test data, the software can post-process the test output data and generate a list of every rule or rule case that was not triggered by any of the test cases. This information can be overlaid on the display of rules in the editor to quickly show the user which rules were or were not triggered. From this information, the user can look for possible rules that are obscured by other rules, that is, rules which overlap. Counts can also be shown for each rule case. Counts can be as useful as just knowing whether a rule case triggered, especially for tuning values to achieve a desired distribution of outputs and for identifying the most likely rule cases for adjusting performance.

Transform Generation

Business rules are evaluated in an application (graph) by converting each rule set into a transform. The transform is then attached to a component in a graph. Such components may be subgraphs that contain a set of standard components linked in a particular way to execute the transform. These subgraphs can then be used with additional components, for example to use keys for joins and rollups.

Figure 6:
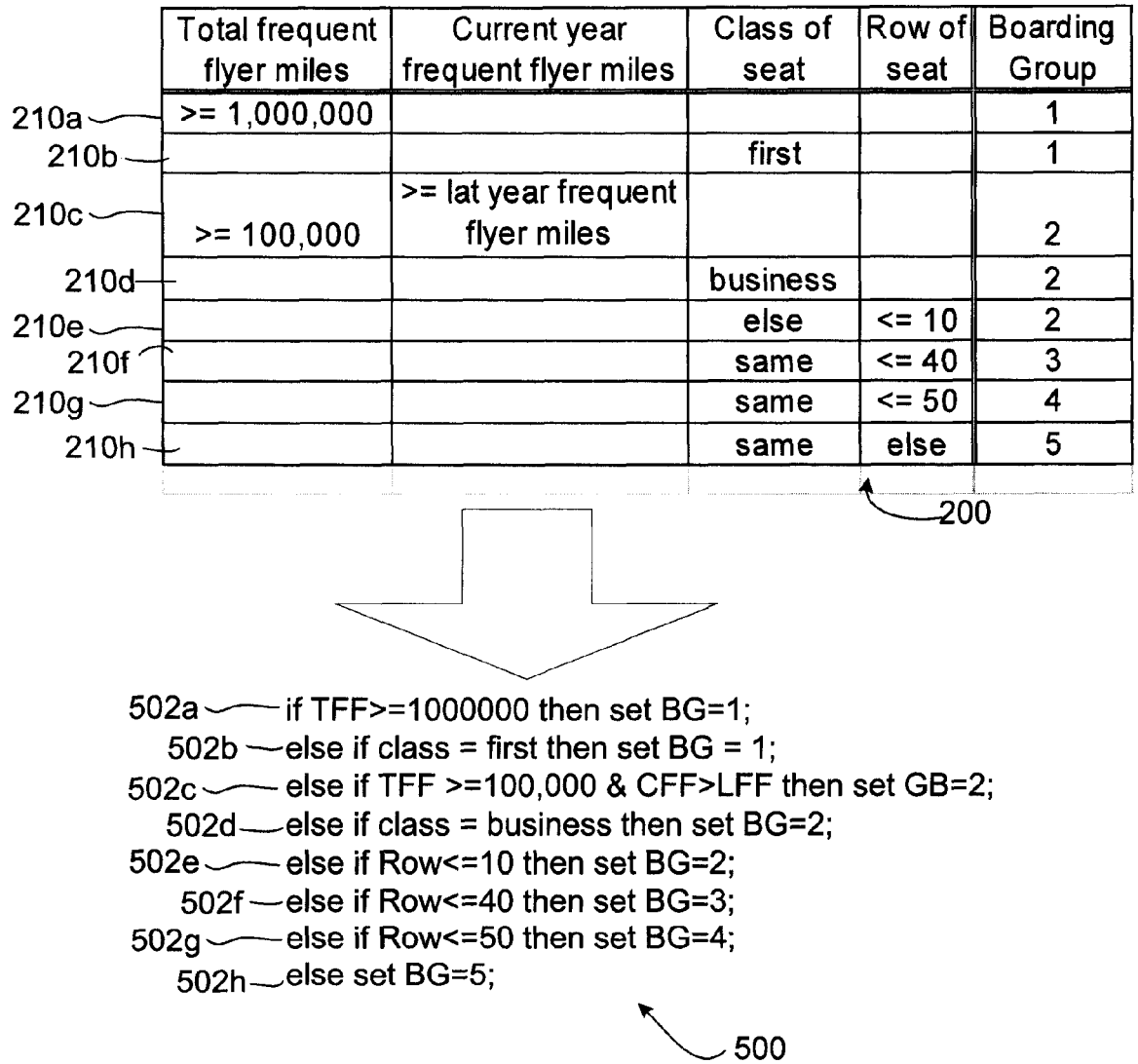
FIG. 6 is an example transform code.

Transform code can be generated from business rules in multiple ways. In examples in which the internals of the transforms are not designed to be user-edited, the generation process can result in transforms that are difficult to comprehend, but which implement the rules more efficiently than applying the rules one-by-one. In some examples, as shown in FIG. 6, simple if-then-else chains 500 can be used to capture the logic in the rules sets (the rule set table 200 of FIG. 2A is repeated for reference). In the chain 500 shown, there is one "if . . . then . . . " clause 502i for each rule case 210a. Such chains can be used as-is, or they can be further optimized depending on the availability of appropriate computing resources and the priorities of the users of the system. In some cases, specialized lookup files or other technologies may be used to improve performance of the generated transform. Some details of how a transform is generated can be stored in a deployment. A rule set that may be used in multiple graphs may have multiple deployments for its different possible users. A rule set may also contain a super set of rules, only some of which are required in each deployment, with the deployment identifying which rules to use when the transform is generated.

In some examples, If the rule includes a column that is a decimal, and there is a large number of different values matched for that column, then we can improve the performance of the transform by writing a "switch" statement branching on the indicated column. For example, consider this rule:

| Flight Number | Row of Seat | Boarding Group (output) |
|---|---|---|
| 1 | <10 | 1 |
| 1 |  | 2 |
| 2 | <15 | 1 |
| 2 |  | 2 |
| 3 |  | 1 |
| 4 |  | 1 |
| 5 | <10 | 1 |
| 5 | <20 | 2 |
| 5 |  | 3 |

The transform for this rule could be generated in two ways. Like this:

```
if (NUM == 1 and ROW < 10) then BG = 1
else if (NUM == 1) then BG = 2
else if (NUM == 2 and ROW < 15) then BG = 1
else if (NUM ==2) then BG = 2
else if . . .
Or like this:
Switch (NUM)
    Case 1: if (ROW < 10) then BG = 1 else BG = 2
    Case 2: if (ROW < 15) then BG = 1 else BG = 2
    . . .
```

Another technique we can use is an in memory lookup file. If the rule has a lot of constant values, with few (if any) expressions, then instead of if then else logic, we can just use a lookup table. In this case, the lookup table is part of the rule (not saved separately). For example, consider this rule:

| From City | Dest City | Class of Service | expression | Frequent Flyer Miles (output) |
|---|---|---|---|---|
| BOS | LAX | First |  | 6000 |
| BOS | LAX | Business |  | 3000 |
| BOS | LAX | Coach | Is Using Miles = yes | 0 |
| BOS | LAX | Coach | else | 3000 |
| BOS | CHI | First |  | 2000 |
| BOS | CHI | Coach |  | 1000 |
| BOS | NYC | First |  | 1500 |
| BOS | NYC | Business |  | 1000 |
| BOS | NYC | Coach |  | 500 |

This rule is handled by building an in-memory lookup table with the following information:

| from | dest | class | expr | miles |
|---|---|---|---|---|
| BOS | LAX | 1 | 0 | 6000 |
| BOS | LAX | 2 | 0 | 3000 |
| BOS | LAX | 3 | 1 | 3000 |
| BOS | CHI | 1 | 0 | 2000 |
| BOS | CHI | 2 | 0 | 1000 |
| BOS | NYC | 1 | 0 | 1500 |
| BOS | NYC | 2 | 0 | 1000 |
| BOS | NYC | 3 | 0 | 500 |

Then the transform is something like this:
int expr=lookup(from, dest, class).expr
int miles=lookup(from, dest, class).miles
if (expr==1 and is_using_miles) miles=0
return miles;

Each rule set has a deployment table. The deployment table maps a name to details about the configuration of that deployment. Each entry in the deployment table contains the following information:
1. Deployment name. An arbitrary string that must be unique within the rule set.
2. Input dataset name. If there are multiple input datasets listed in the input variable table, then each entry in the deployment table indicates which input dataset is used for that deployment.
3. Output dataset name. If there are multiple output datasets listed in the output variable table, then each entry in the deployment table indicates which output dataset is used for that deployment.
4. Deployment name for each included rule set. For each included rule set, we need to indicate which deployment should be used for each corresponding deployment of the including rule set.
5. Target location for the component and the transform file to be generated.

In some examples, there is always at least one deployment, named default. This is the deployment that is used when no other deployment is specified.

Here are the basics of transform generation, in one exemplary embodiment. First, the software will only generate rules for outputs that are computed in the rule set. All other outputs will be handled with a wildcard rule in the transform. In general, output variables that are only used internally cause local variables to be created in the generated transform. That said, the generated transform may include more local variables, as necessary, to avoid duplicated calculations (for example, if optimizing is for speed over space).

Figure 7:
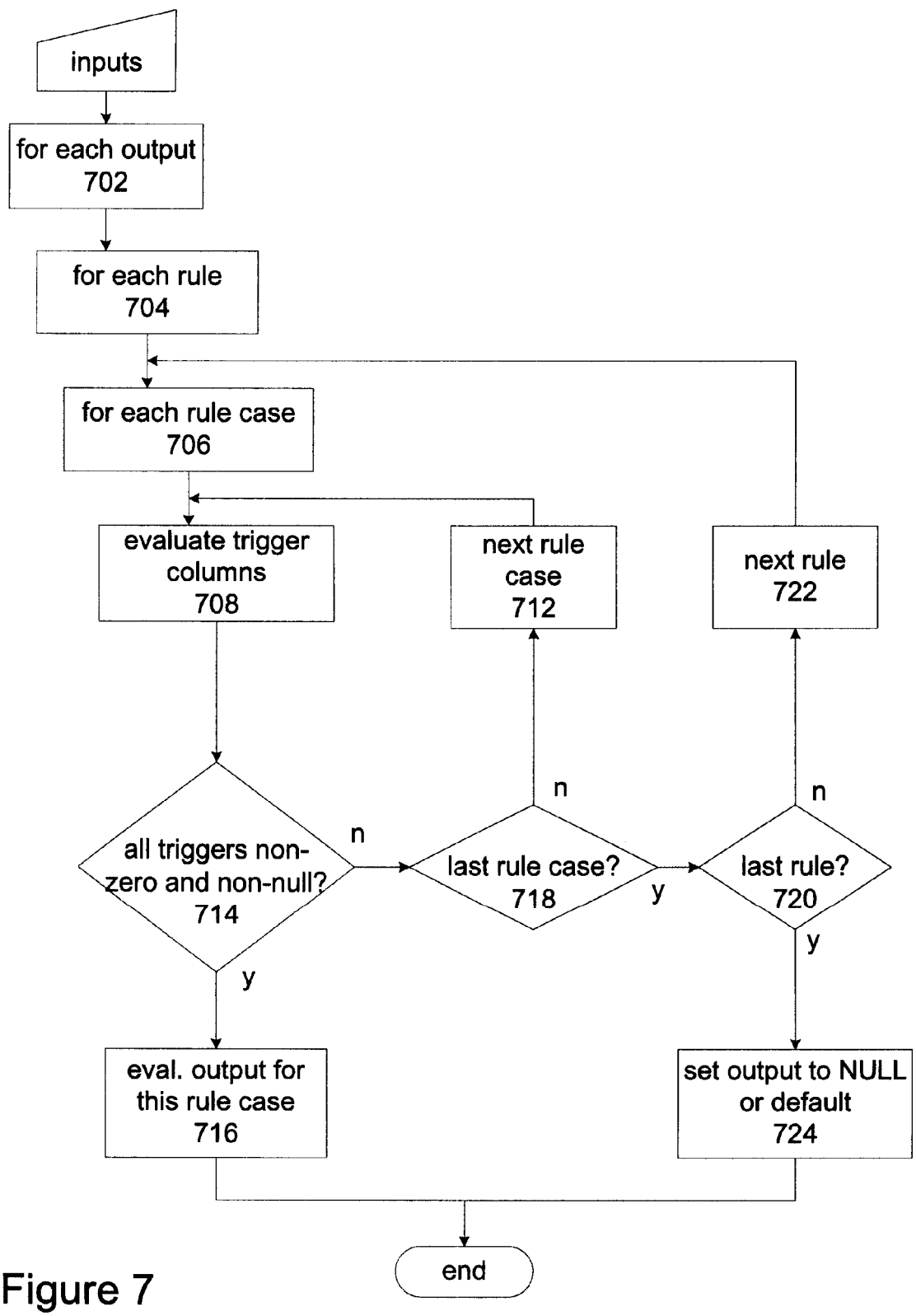

FIG. 7 shows how a rule set is evaluated within a generated transform. For each output (702), the relevant rules are evaluated in order. For rules that generate disjoint outputs, the transform generator decides on the order of evaluation of the rules based on dependency analysis. Circularities are not allowed and are reported as errors. If two or more rules generate the same outputs, their order of execution is the same as the order that they are listed in, in the rule set. Within each rule (704), the rule cases are evaluated in order, top to bottom. For each rule case (706), the trigger columns of each rule may be evaluated (708) in an undefined order (e.g., the software may not guarantee the order of evaluation within the single case of a rule). As soon as one rule case is found in which all the triggers are true (not zero/false and not null) (714), the corresponding output values are used (716). As long as rule cases evaluate false, the process continues (718, 712, 720, 722). If no rule triggers for a given output (720), the transform will explicitly set the output value to NULL or the default value as appropriate (724).

There are some transform differences depending on the transform type:

Reformat—The input is called "in," and input variables may have technical names like "in.field." The output is called "out,' and output variables may have technical names like "out.field."

Join—The two inputs are called "in0" and "in1." The output is called "out," and the wildcard rule assumes that in0 is copied to "out." All the parameters may be set when the component is generated. The rule set will have multiple sets of inputs, one for each input to the join. The rule set will also specify the join type, whether inputs should be de-duped, and the business name of the fields used as the key to the join (in some examples, this must be present in each input set). Also, user may be allowed to specify an expression for each input that is used as an input filter.

Rollup—The input is called "in" and the output is called "out." In the case of a rollup-type rule set, the user is allowed to use the aggregation functions (which are not supported in other transform types). If the user creates an output variable whose technical name is "input_select" or "output_select," then an "input_select" and/or "output_select" function is added to the transform with the logic of the rules that compute those outputs. The input of both of those functions is called "in" (even though output_select usually names its parameter "out"). As in the join type, all the parameters may be set when the component is generated.

Filter—One of two predefined constants is output. The only output variable for a Filter-type transform is "select," of type component, which is non-zero and non-NULL to pass the output. In some examples, this is implemented as a reformat component in a subgraph.

Additional transform types may also be implemented:

Scan—The scan function takes two inputs, named "temp" and "in" and produces an output named "out." Rules in the rule set may use fields both from the temp and the in records. This may be determined by the technical name for the input variables. (For example, the technical names may be set to strings "temp.field" or "in.field.")

The record format for the transform's temporary variable ("temp") contains every output generated by the rule set. An initialize function is created automatically by the software to initialize every field in the temporary record format to their default values. A finalize function is also created automatically by the software; this function simply copies the temporary record to the output and adds the wildcard rule. The scan-type transform also supports creating an input_select function and an output_select function, like the Rollup case, if variables with those technical names are in the output variables table.

Normalize—The normalize function takes two inputs, "in" and "index," and produces an output named "out." The index input is not a record, instead users create an input variable mapped to a technical name of index if they want to use the index in rules. (The index variable can also be used in the various DML expressions). The software will a length as it goes through the rules as described earlier.

A normalize-type rule set also supports output variables named "input_select" and "output_select," just like the rollup-type rule set.

Classification—A rule has N outputs and the transform decides which output should be used for each record. For this component, the software creates a out::classify(in) function. The output is a single integer value, indicating which output port (there can be more than one) should be used. An output of 0 means the zeroth port, an output of 1 means the first port, etc.

The only output variable for a Classification-type transform is "select," of type component, which will be the index of the output port (zero-based). This is similar to a filter except that N values are used instead of two for the output.

Function—A function-type rule set can be turned into a DML transform file, but not as a component transform. Instead, when a function-type rule set is turned into a transform, the constructed transform file is designed to be included in other transforms. Each output variable is turned into a DML function. The inputs for those functions depend on the type of rule. For a function-type rule, the inputs are the inputs to the rule in the order listed in the table. For non-function-type rules, each output function takes a single input, named in, that is a record with all the fields corresponding to the input variables.

When a rule set is used to generate a transform that will in turn be part of a graph, the graph component includes the name of the rule set and a deployment. A graph developer can then edit the rule set instead of the generated transform in the component. Changes to the rule set cause the transform to be regenerated.

Other features and variations may include generating reports about rules in use in a particular rule set, a more finely-grained permission models, for example, allowing some users to edit rules but not add inputs. An intra-rule dependency tree could be implemented for each output. Rules or rule sets may have effective dates or expiration dates. A single input record may produce multiple outputs, for example, if multiple rules have their criteria satisfied, they all may operate instead of just the first one. Support for vector output may be provided. Users may be able to specify their own validation functions during editing, for example, to further protect or constrain business users.

The business rules management approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for specifying the behavior of a functional component in a computation system, including:
   providing a user interface for creating a table having at least one input column and at least one output column, wherein each input column is associated with an input variable and each output column is associated with an output variable;
   in at least one row of the table,
      receiving one or more conditions on input values in respective input columns, the conditions in the at least one row identifying more than one set of potential values of the input variables, and
      receiving one or more output values in respective output columns,
      thereby defining a rule case of a rule specification;
   generating a function for transforming data based on the rule specification;
   associating the function with the functional component;
   receiving a test table including a set of test columns, each test column containing a value for one or more of the input variables;
   for each test column, identifying a row of the rule specification that will generate an output given the input values of the test column; and
   outputting to a user the identification of the identified row for each test column.

2. The method of claim 1 in which the one or more conditions on input values include one or more of: having a value equal to a threshold, having a value above a threshold, having a value below a threshold, having a value belonging to a set of values, having a value matching a pattern, having a relationship to a value of another input, having a relationship to a value of an output of another rule specification, or having a relationship to a value in a memory.

3. The method of claim 1 in which the one or more output values include one or more or a combination of values of the inputs, a pre-determined value, or a value computed from one or more of the values of the inputs.

4. The method of claim 1 also including
   generating a results table including a results row for each test column, each results row indicating an output that will be generated given the input values of the test column.

5. The method of claim 4 also including, in each results row, indicating whether the output that will be generated is changed from an output that was indicated for a previous version of the rule specification.

6. The method of claim 4 also including, in response to a user interaction with a results row, indicating which row of the rule specification will generate the output in that results row.

7. The method of claim 4 also including
   generating an evaluation table including an evaluation row corresponding to each row of the rule specification,
   in each evaluation row of the table, for each potential input, indicating whether the value in a first test column for that potential input satisfied the relationship for that potential input, and
   in an evaluation row corresponding to the row of the rule specification that will generate an output given the input values of the first test column, indicating the output that will be generated.

8. The method of claim 7 in which the evaluation rows have an order corresponding to an order of the rows of the rule specification, and the evaluation row in which the output is indicated corresponds to the first row of the rule specification for which each of the relationships for the potential inputs is satisfied.

9. The method of claim 7 also including indicating an output that will be generated in each evaluation row corresponding to a row of the rule specification for which each of the relationships for the potential inputs is satisfied.

10. The method of claim 4 also including
    generating an evaluation table including an evaluation row corresponding to each row of the rule specification, and
    in each evaluation row, indicating how many test columns have inputs that satisfy the relationships in the corresponding row of the rule specification.

11. The method of claim 4 in which each test column also contains an expected output value, the method also including
    each results row indicating whether the output that will be generated given the input values of the corresponding test column match the expected output in that test column.

12. The method of claim 1 also including
    generating a table including a results row for each test column, each results row indicating each output generated by a row in one of the rule specifications given the input values of the test column.

13. The method of claim 1 also including
    for an output that will be generated given the input values of a first test column, generating a graphical display of interrelationships between inputs and outputs of rule specifications that will result in the generation of that output.

14. The method of claim 1 in which receiving the table of test columns includes receiving from a user a set of input values, matching the set of input values to the potential input values of the rule specification, and storing the set of input values to a column of the table.

15. The method of claim 14 in which the receiving of a set of input values is in response to displaying identifications of the potential input values.

16. The method of claim 1 also including in response to determining that each rule specification in a set of rule specifications will generate at least one output, determining that the set of rule specifications is valid.

17. The method of claim 1 in which generating the function includes converting each of a plurality of rule cases in the rule specification to a logical expression to form a plurality of logical expressions, and compiling the plurality of logical expressions into computer-executable code.

18. The method of claim 17 in which compiling the plurality of logical expressions includes one or more of combining expressions, optimizing individual expressions, and optimizing groups of expressions.

19. The method of claim 17 in which compiling the plurality of logical expressions includes associating the expressions with components suitable for use in the computation.

20. The method of claim 1 also including determining whether the one or more output values correspond to an error condition, and generating an error for reporting to a user before the functional component is run.

21. The method of claim 20 in which the error condition corresponds to a null output value for a respective output column that is not nullable.

22. A system, for specifying the behavior of a functional component in a computation system, the system including:

means for providing a user interface for creating a table having at least one input column and at least one output column, wherein each input column is associated with an input variable and each output column, is associated with an output variable;

the user interface receiving, in at least one row of the table, one or more conditions on input values in respective input columns, the conditions in the at least one row identifying more than one set of potential values of the input variables, and one or more output values in respective output columns, thereby defining a rule case of a rule specification, a processor configured to generate a function for transforming data based on the rule specification, associate the function with the functional component, receive a test table including a set of test columns, each test column containing a value for one or more of the input variables, for each test column, identify a row of the rule specification that will generate an output given the input values of the test column, and output to a user the identification of the identified row for each test column.

23. The system of claim 22, the processor further configured to generate a results table including a results row for each test column, each results row indicating an output that will be generated given the input values of the test column.

24. The system of claim 23, the processor further configured to generate an evaluation table including an evaluation row corresponding to each row of the rule specification, in each evaluation row of the table, for each potential input, indicate whether the value in a first test column for that potential input satisfied the relationship for that potential input, and in an evaluation row corresponding to the row of the rule specification that will generate an output given the input values of the first test column, indicate the output that will be generated.

25. The system of claim 24 in which the evaluation rows have an order corresponding to an order of the rows of the rule specification, and the evaluation row in which the output is indicated corresponds to the first row of the rule specification for which each of the relationships for the potential inputs is satisfied.

26. The system of claim 24, the processor further configured to indicate an output that will be generated in each evaluation row corresponding to a row of the rule specification for which each of the relationships for the potential inputs is satisfied.

27. The system of claim 23, the processor further configured to generate an evaluation table including an evaluation row corresponding to each row of the rule specification, and in each evaluation row, indicate how many test columns have inputs that satisfy the relationships in the corresponding row of the rule specification.

28. The system of claim 23 in which each test column also contains an expected output value, each results row indicating whether the output that will be generated given the input values of the corresponding test column match the expected output in that test column.

29. The system of claim 22, the processor further configured to generate a table including a results row for each test column, each results row indicating each output generated by a row in one of the rule specifications given the input values of the test column.

30. The system of claim 22, the processor further configured to, for an output that will be generated given the input values of a first test column, generate a graphical display of interrelationships between inputs and outputs of rule specifications that will result in the generation of that output.

31. The system of claim 22 in which receiving the table of test columns includes receiving from a user a set of input values, matching the set of input values to the potential input values of the rule specification, and storing the set of input values to a column of the table.

32. The system of claim 22 in which generating the function includes converting each of a plurality of rule cases in the rule specification to a logical expression to form a plurality of logical expressions, and compiling the plurality of logical expressions into computer-executable code.

33. A computer program, stored on a storage medium, specifying the behavior of a functional component in a computation system, the computer program including instructions for causing a computer to:

provide a user interface for creating a table having at least one input column the conditions in the at least one row identifying more than one set of potential values of the input variables, and at least one output column, wherein each input column is associated with an input variable and each output column, is associated with an output variable;

receive, in at least one row of the table,
- one or more conditions on input values in respective input columns, the conditions in the at least one row identifying more than one set of potential values of the input variables,
- and receive one or more output values in respective output columns,
- thereby defining a rule case of a rule specification, generate a function for transforming data based on the rule specification, associate the function with the functional component, receive a test table including a set of test columns, each test column containing a value for one or more of the input variables, for each test column, identify a row of the rule specification that will generate an output given the input values of the test column, and output to a user the identification of the identified row for each test column.

34. The computer program of claim 33, further including instructions for causing a computer to generate a results table including a results row for each test column, each results row indicating an output that will be generated given the input values of the test column.

35. The computer program of claim 34, further including instructions for causing a computer to generate an evaluation table including an evaluation row corresponding to each row of the rule specification, in each evaluation row of the table, for each potential input, indicate whether the value in a first test column for that potential input satisfied the relationship for that potential input, and in an evaluation row corresponding to the row of the rule specification that will generate an output given the input values of the first test column, indicate the output that will be generated.

36. The computer program of claim 35 in which the evaluation rows have an order corresponding to an order of the rows of the rule specification, and the evaluation row in which the output is indicated corresponds to the first row of the rule specification for which each of the relationships for the potential inputs is satisfied.

37. The computer program of claim 35, further including instructions for causing a computer to indicate an output that will be generated in each evaluation row corresponding to a row of the rule specification for which each of the relationships for the potential inputs is satisfied.

38. The computer program of claim 34, further including instructions for causing a computer to generate an evaluation table including an evaluation row corresponding to each row of the rule specification, and in each evaluation row, indicate how many test columns have inputs that satisfy the relationships in the corresponding row of the rule specification.

39. The computer program of claim 34 in which each test column also contains an expected output value, each results row indicating whether the output that will be generated given the input values of the corresponding test column match the expected output in that test column.

40. The computer program of claim 33, further including instructions for causing a computer to generate a table including a results row for each test column, each results row indicating each output generated by a row in one of the rule specifications given the input values of the test column.

41. The computer program of claim 33, further including instructions for causing a computer to, for an output that will be generated given the input values of a first test column, generate a graphical display of interrelationships between inputs and outputs of rule specifications that will result in the generation of that output.

42. The computer program of claim 33 in which receiving the table of test columns includes receiving from a user a set of input values, matching the set of input values to the potential input values of the rule specification, and storing the set of input values to a column of the table.

43. The computer program of claim 33 in which generating the function includes converting each of a plurality of rule cases in the rule specification to a logical expression to form a plurality of logical expressions, and compiling the plurality of logical expressions into computer-executable code.

* * * * *

UNITED STATES PATENT AND TRADEMARK OFFICE
CERTIFICATE OF CORRECTION

PATENT NO. : 8,069,129 B2  
APPLICATION NO. : 11/733434  
DATED : November 29, 2011  
INVENTOR(S) : Joel Gould, Joseph Skeffington Wholey, III and Timothy Perkins Page 1 of 1

It is certified that error appears in the above-identified patent and that said Letters Patent is hereby corrected as shown below:

On the Title Page, (Attorney, Agent, or Firm), Line 1, Delete "Richardson," and insert
-- Richardson --

Column 31, Line 35, In Claim 22, delete "system," and insert -- system --

Column 31, Line 40, In Claim 22, delete "column, is" and insert -- column is --

Column 33, Line 2, In Claim 33, delete "column, is" and insert -- column is --

Signed and Sealed this
Sixth Day of March, 2012

David J. Kappos
*Director of the United States Patent and Trademark Office*